US012761573B2

(12) United States Patent
Ookubo et al.

(10) Patent No.: US 12,761,573 B2
(45) Date of Patent: Oct. 13, 2026

(54) TONER

(71) Applicant: CANON KABUSHIKI KAISHA, Tokyo (JP)

(72) Inventors: Kenji Ookubo, Shizuoka (JP); Naoya Isono, Shizuoka (JP); Masaya Komuro, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 525 days.

(21) Appl. No.: 18/350,260

(22) Filed: Jul. 11, 2023

(65) Prior Publication Data

US 2024/0027929 A1 Jan. 25, 2024

(30) Foreign Application Priority Data

Jul. 15, 2022 (JP) ................................ 2022-113834
Jun. 22, 2023 (JP) ................................ 2023-102647

(51) Int. Cl.
*G03G 9/08* (2006.01)
*G03G 9/087* (2006.01)
*G03G 9/093* (2006.01)

(52) U.S. Cl.
CPC ......... *G03G 9/0825* (2013.01); *G03G 9/0815* (2013.01); *G03G 9/0819* (2013.01);
(Continued)

(58) Field of Classification Search
CPC .. G03G 9/0825; G03G 9/0815; G03G 9/0819; G03G 9/08724; G03G 9/08773; G03G 9/09328; G03G 9/09364
See application file for complete search history.

(56) References Cited

U.S. PATENT DOCUMENTS 7,393,912 B2 7/2008 Mihara
7,399,568 B2 7/2008 Fuku
(Continued)

FOREIGN PATENT DOCUMENTS

JP H09114134 A * 5/1997
JP 9-179341 A 7/1997
(Continued)

OTHER PUBLICATIONS

JP-H09114134-A Translation (Year: 2026).*
(Continued)

*Primary Examiner* — Amber R Orlando
*Assistant Examiner* — Charles Collins Sullivan, IV
(74) *Attorney, Agent, or Firm* — VENABLE LLP

(57) ABSTRACT

A toner comprising a toner particle comprising: a toner base particle; and an organosilicon polymer at a surface of the toner base particle, wherein protruded portions constituted from the organosilicon polymer are present at the surface of the toner base particle, when a specific reciprocating shaking test is carried out, the toner particle is measured in terms of a total area S of a surface of the toner particle and an area Sc of regions of the surface of the toner base particle coated with the organosilicon polymer at the surface of the toner particle before and after the test, values of Sc/S for the toner particle before and after the test are respectively defined as $R_0$ and $R_1$, the value of $R_0$ is 0.30 to 0.70, a value of $(R_0-R_1)/R_0$ is 0.20 or less, and a storage elastic modulus at 100° C. of the toner is 8000 to 50,000 Pa.

9 Claims, 1 Drawing Sheet

(52) U.S. Cl.
CPC ..... *G03G 9/08724* (2013.01); *G03G 9/08773* (2013.01); *G03G 9/09328* (2013.01); *G03G 9/09364* (2013.01)

(56) References Cited

U.S. PATENT DOCUMENTS

| | | | |
|---|---|---|---|
| 7,452,960 | B2 | 11/2008 | Yano |
| 7,510,813 | B2 | 3/2009 | Yano |
| 7,638,194 | B2 | 12/2009 | Fukui |
| 7,638,590 | B2 | 12/2009 | Fukui |
| 7,682,765 | B2 | 3/2010 | Sugawa |
| 7,795,363 | B2 | 9/2010 | Fukui |
| 7,811,735 | B2 | 10/2010 | Nakamura et al. |
| 7,935,771 | B2 | 5/2011 | Fukui |
| 8,067,136 | B2 | 11/2011 | Yano |
| 8,110,329 | B2 | 2/2012 | Tominaga |
| 8,178,271 | B2 | 5/2012 | Fukui |
| 8,288,069 | B2 | 10/2012 | Fujikawa |
| 8,323,726 | B2 | 12/2012 | Naka |
| 8,367,289 | B2 | 2/2013 | Isono |
| 8,383,312 | B2 | 2/2013 | Fujimoto |
| 8,440,382 | B2 | 5/2013 | Isono |
| 8,497,054 | B2 | 7/2013 | Sugiyama |
| 8,574,801 | B2 | 11/2013 | Itabashi |
| 8,609,312 | B2 | 12/2013 | Itabashi |
| 8,652,737 | B2 | 2/2014 | Handa |
| 8,778,581 | B2 | 7/2014 | Nonaka |
| 8,828,633 | B2 | 9/2014 | Itabashi |
| 8,918,035 | B2 | 12/2014 | Hasegawa |
| 8,986,914 | B2 | 3/2015 | Fujikawa |
| 9,029,056 | B2 | 5/2015 | Kenmoku |
| 9,034,549 | B2 | 5/2015 | Shiotari |
| 9,098,002 | B2 | 8/2015 | Kenmoku |
| 9,098,003 | B2 | 8/2015 | Masumoto |
| 9,158,216 | B2 | 10/2015 | Shimano |
| 9,244,371 | B2 | 1/2016 | Suzumura |
| 9,256,148 | B2 | 2/2016 | Fujikawa |
| 9,261,806 | B2 | 2/2016 | Moribe |
| 9,285,697 | B2 | 3/2016 | Fukudome |
| 9,304,422 | B2 | 4/2016 | Matsui |
| 9,348,246 | B2 | 5/2016 | Magome |
| 9,354,545 | B2 | 5/2016 | Matsui |
| 9,377,705 | B2 | 6/2016 | Shimano |
| 9,377,708 | B2 | 6/2016 | Magome |
| 9,383,668 | B2 | 7/2016 | Noji |
| 9,423,711 | B2 | 8/2016 | Uratani |
| 9,423,714 | B2 | 8/2016 | Kenmoku |
| 9,442,416 | B2 | 9/2016 | Magome |
| 9,500,972 | B2 | 11/2016 | Tanaka |
| 9,575,424 | B2 | 2/2017 | Nakagawa |
| 9,594,323 | B2 | 3/2017 | Fujikawa |
| 9,599,919 | B2 | 3/2017 | Isono |
| 9,625,842 | B2 | 4/2017 | Uratani |
| 9,658,546 | B2 | 5/2017 | Tanaka |
| 9,658,549 | B2 | 5/2017 | Tanaka |
| 9,785,071 | B2 | 10/2017 | Shimano |
| 9,804,514 | B2 | 10/2017 | Suzumura |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,880,478 | B2 | 1/2018 | Shimano |
| 9,904,193 | B2 | 2/2018 | Nakagawa |
| 9,958,801 | B2 | 5/2018 | Tanaka |
| 9,964,874 | B2 | 5/2018 | Suzumura |
| 10,054,866 | B2 | 8/2018 | Tanaka |
| 10,078,279 | B2 | 9/2018 | Nakagawa |
| 10,101,681 | B2 | 10/2018 | Tagawa |
| 10,114,303 | B2 | 10/2018 | Katsura |
| 10,216,107 | B2 | 2/2019 | Tsubaki |
| 10,228,627 | B2 | 3/2019 | Nagashima |
| 10,310,397 | B2 | 6/2019 | Sano |
| 10,545,420 | B2 | 1/2020 | Kinumatsu |
| 10,578,990 | B2 | 3/2020 | Tsuda |
| 10,678,155 | B2 | 6/2020 | Terui |
| 10,698,327 | B2 | 6/2020 | Nagashima |
| 10,747,133 | B2 | 8/2020 | Yagi |
| 10,747,136 | B2 | 8/2020 | Kenmoku |
| 10,782,623 | B2 | 9/2020 | Yoshiba |
| 10,942,465 | B2 | 3/2021 | Kototani |
| 10,942,466 | B2 | 3/2021 | Tominaga |
| 10,948,839 | B2 | 3/2021 | Tsubaki |
| 10,976,678 | B2 | 4/2021 | Yamawaki |
| 10,976,679 | B2 | 4/2021 | Tanaka |
| 11,003,104 | B2 | 5/2021 | Katsura |
| 11,003,105 | B2 | 5/2021 | Sato |
| 11,086,242 | B2 | 8/2021 | Isono |
| 11,112,708 | B2 | 9/2021 | Uratani |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,845 | B2 | 11/2021 | Shimoda |
| 11,249,412 | B2 | 2/2022 | Kawamura |
| 11,256,187 | B2 | 2/2022 | Ogaki |
| 11,314,178 | B2 | 4/2022 | Kenmoku |
| 11,347,157 | B2 | 5/2022 | Kamikura |
| 11,397,386 | B2 | 7/2022 | Kyuushima |
| 11,531,282 | B2 | 12/2022 | Kamikura |
| 11,714,363 | B2 | 8/2023 | Ookubo |
| 2012/0328979 | A1 | 12/2012 | Yoshizaki |
| 2013/0011774 | A1 | 1/2013 | Kamiwaki et al. |
| 2015/0099222 | A1 | 4/2015 | Terui |
| 2020/0026208 | A1 | 1/2020 | Terui |
| 2020/0124998 | A1 | 4/2020 | Kototani |
| 2020/0209771 | A1 | 7/2020 | Hashimoto et al. |
| 2020/0292955 | A1 | 9/2020 | Matsunaga et al. |
| 2020/0341400 | A1 | 10/2020 | Shimoda et al. |
| 2021/0026265 | A1* | 1/2021 | Kamikura .......... G03G 9/09791 |
| 2021/0223731 | A1 | 7/2021 | Suzuki et al. |
| 2021/0311405 | A1 | 10/2021 | Shiotari |
| 2021/0318630 | A1 | 10/2021 | Terui |
| 2021/0318631 | A1 | 10/2021 | Isono |
| 2022/0075284 | A1 | 3/2022 | Nakayama |
| 2022/0128915 | A1 | 4/2022 | Toyoda |
| 2022/0128916 | A1 | 4/2022 | Yoshida |
| 2022/0128918 | A1 | 4/2022 | Kototani |
| 2022/0128919 | A1 | 4/2022 | Kawamura |
| 2022/0146952 | A1 | 5/2022 | Komiya |
| 2022/0146953 | A1 | 5/2022 | Kyuushima |
| 2022/0146954 | A1 | 5/2022 | Kato |
| 2022/0146955 | A1 | 5/2022 | Nozaki |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |
| 2022/0413407 | A1 | 12/2022 | Inoue |
| 2023/0080900 | A1 | 3/2023 | Kamikura |
| 2023/0114583 | A1 | 4/2023 | Kenmoku |
| 2023/0116451 | A1 | 4/2023 | Uratani |
| 2023/0117448 | A1 | 4/2023 | Fukudome |
| 2023/0119795 | A1 | 4/2023 | Saeki |
| 2023/0161277 | A1 | 5/2023 | Komiya |

FOREIGN PATENT DOCUMENTS

| | | | |
|---|---|---|---|
| JP | H09179341 | A * | 7/1997 |
| JP | 2008-9211 | A | 1/2008 |
| JP | 2011-227498 | A | 11/2011 |
| JP | 2015-96948 | A | 5/2015 |
| JP | 2019-86641 | A | 6/2019 |
| JP | 2020-12943 | A | 1/2020 |
| JP | 2020-64254 | A | 4/2020 |
| JP | 2020-154292 | A | 9/2020 |
| JP | 2020-181187 | A | 11/2020 |
| JP | 2021-18335 | A | 2/2021 |
| JP | 2021-113861 | A | 8/2021 |
| JP | 2021-167896 | A | 10/2021 |
| JP | 2022-25866 | A | 2/2022 |

(56) References Cited

FOREIGN PATENT DOCUMENTS

| | | | |
|---|---|---|---|
| JP | 2022-69321 | A | 5/2022 |
| JP | 2022-92582 | A | 6/2022 |

OTHER PUBLICATIONS

JP-H09179341-A Translation (Year: 2026).*
U.S. Appl. No. 18/321,312, Keisuke Adachi, filed May 22, 2023.
U.S. Appl. No. 18/327,506, Masaya Komuro, filed Jun. 1, 2023.
U.S. Appl. No. 18/350,248, Yoshiaki Shiotari, filed Jul. 11, 2023.
U.S. Appl. No. 18/350,266, Mayumi Inoue, filed Jul. 11, 2023.
U.S. Appl. No. 18/350,309, Naoya Isono, filed Jul. 11, 2023.
U.S. Appl. No. 18/350,331, Shohei Kototani, filed Jul. 11, 2023.
U.S. Appl. No. 18/354,776, Shohei Kototani, filed Jul. 19, 2023.
Robert F. Fedors, A Method for Estimating Both the Solubility Parameters and Molar Volumes of Liquids, Polymer Engineering and Science, vol. 14, No. 2, 147-154,1974.

* cited by examiner

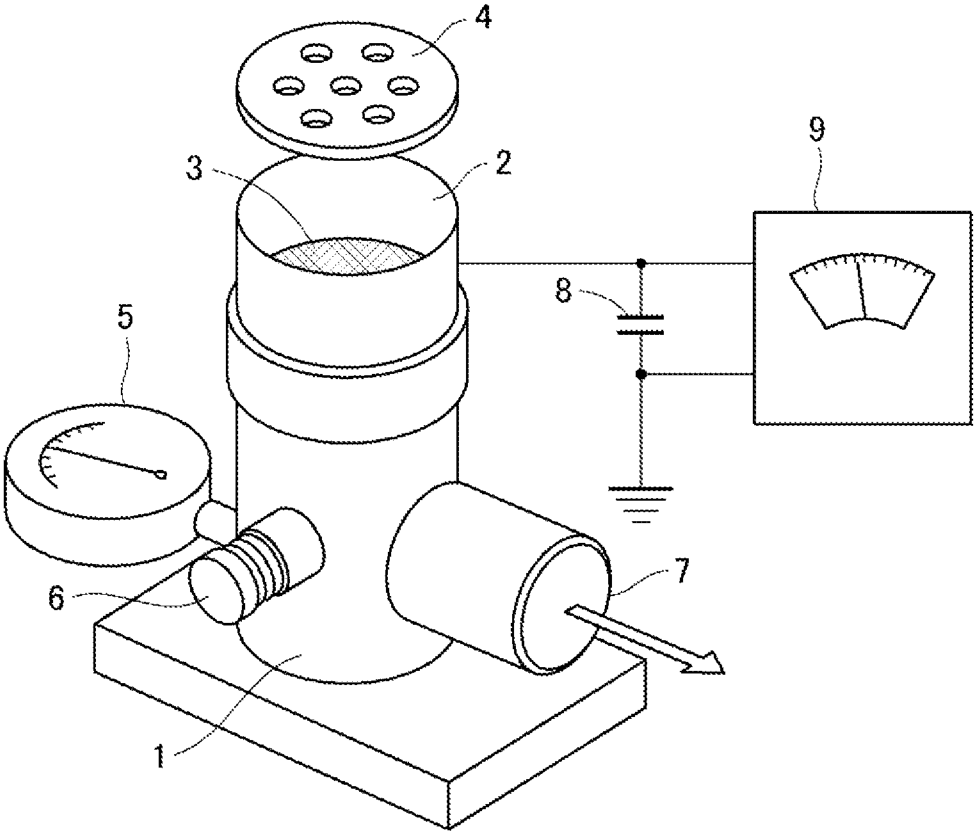
4
9
3
2
8
5
6
7
1

TONER

BACKGROUND OF THE INVENTION

Field of the Invention

The present invention relates to a toner used in a recording method that employs an electrophotography method or the like.

Description of the Related Art

As intended uses and usage environments of image forming apparatuses such as copiers and printers have become more varied in recent years, there have been demands for lower energy consumption and longer service life.

A variety of means are known as image-forming methods, but among these, electrophotography is a principal technique. Processes carried out in electrophotography are as follows. First, an electrostatic latent image is formed on an electrostatic image bearing member (hereinafter also referred to as a "photosensitive member") using a variety of means. Next, the latent image is converted into a visible image by developing with a developer (hereinafter also referred to as a "toner"), the toner image is transferred to a recording medium such as a paper if necessary, and the toner image is fixed on the recording medium by means of heat, pressure, or the like, so as to obtain a copied article.

It is possible to reduce energy consumption if the fixation temperature of a toner can be lowered, but because toners able to be fixed at a low temperature have reduced hardness at room temperature, there tends to be a trade-off between low-temperature fixability and durability. Many techniques have been proposed for achieving both low-temperature fixability and durability, and Japanese Patent Application Publication No. 2021-167896, for example, discloses achieving both low-temperature fixability and durability in a toner particle containing an organosilicon polymer that coats a toner base particle by controlling the state of coating of the organosilicon polymer.

In addition, Japanese Patent Application Publication No. 2020-154292 discloses achieving both low-temperature fixability and durability in a toner having a toner particle containing an organosilicon polymer at the surface of a toner base particle by controlling the protrusion height of the organosilicon polymer.

SUMMARY OF THE INVENTION

However, it was understood that a toner having a toner particle containing a toner base particle whose surface is coated with an organosilicon polymer has room for improvement in terms of low-temperature fixability, and especially rubbing fixability, even if the organosilicon polymer forms a protruded portion at the surface of the toner base particle. This is thought to be because binding between toner particles after fixing is weakened by the organosilicon polymer at the surface. Therefore, in order for a toner having a toner particle containing a toner base particle whose surface is coated with an organosilicon polymer to exhibit equivalent rubbing fixability to a toner having a toner particle containing a toner base particle whose surface is not coated with an organosilicon polymer, it was thought to be essential for toner base particles to sufficiently soften at the time of fixing and for toner base particles to be sufficiently wetted and spread between toner particles even if an organosilicon polymer is present at the surface.

It was thought that rubbing fixability could be improved by using a toner base particle able to be readily softened in this way. However, it was understood that simply by using a toner base particle able to be readily softened, toner deformation increases at the time of fixing. If toner deformation increases at the time of fixing, pressure non-uniformity occurs at the time of fixing, meaning that image density non-uniformity (also referred to as mottle hereinafter) occurs.

Therefore, the inventors of the present invention considered the problem of improving rubbing fixability while suppressing mottle.

The present disclosure provides a toner which can improve rubbing fixability while suppressing mottle even if the toner has a toner particle containing an organosilicon polymer that coats a toner base particle.

The present disclosure relates to a toner comprising a toner particle comprising:

a toner base particle comprising a binder resin; and an organosilicon polymer at a surface of the toner base particle, wherein protruded portions constituted from the organosilicon polymer are present at the surface of the toner base particle, when the toner particle and a magnetic carrier are placed in a container, a test is carried out by subjecting the container to reciprocating shaking for a period of 10 hours at a stroke rate of 150/min, a stroke width of 80 mm and a shaking angle of 90° using a reciprocating shaker, the toner particle is measured in terms of a total area S of a surface of the toner particle and an area Sc of those regions of the surface of the toner base particle coated with the organosilicon polymer at the surface of the toner particle before and after the test, a value of Sc/S for the toner particle before the test is defined as $R_0$, and a value of Sc/S for the toner particle after the test is defined as $R_1$, the value of $R_0$ is 0.30 to 0.70, and a value of $(R_0-R_1)/R_0$ is 0.20 or less; and a storage elastic modulus at 100° C. of a disc-like specimen obtained by compression molding the toner into a disc-like shape is 8000 to 50,000 Pa.

According to the present disclosure, it is possible to provide a toner which can improve rubbing fixability while suppressing mottle even if the toner has a toner particle containing an organosilicon polymer that coats a toner base particle. Further features of the present invention will become apparent from the following description of exemplary embodiments with reference to the attached drawings.

BRIEF DESCRIPTION OF THE DRAWINGS

The FIGURE is a schematic view of an apparatus used in a carrier shaking method.

DESCRIPTION OF THE EMBODIMENTS

The present disclosure will now be explained in detail, but is in no way limited to the explanations given below.

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably.

The term "(meth)acrylic acid ester" means an acrylic acid ester and/or a methacrylic acid ester.

The term "monomer unit" refers to a reacted form of a monomer material included in a polymer. For example, a section including a carbon-carbon bond in a main chain of a polymer formed through polymerization of a vinyl monomer will be referred to as a single unit. A vinyl monomer can be represented by the following Formula (C).

(C)

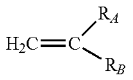

In the Formula (C), $R_A$ represents a hydrogen atom or an alkyl group (preferably, an alkyl group having 1 to 3 carbon atoms, and more preferably a methyl group), and $R_B$ represents any substituent.

The present disclosure relates to a toner comprising a toner particle comprising:

- a toner base particle comprising a binder resin; and
- an organosilicon polymer at a surface of the toner base particle, wherein
- protruded portions constituted from the organosilicon polymer are present at the surface of the toner base particle,
- when the toner particle and a magnetic carrier are placed in a container, a test is carried out by subjecting the container to reciprocating shaking for a period of 10 hours at a stroke rate of 150/min, a stroke width of 80 mm and a shaking angle of 90° using a reciprocating shaker, the toner particle is measured in terms of a total area S of a surface of the toner particle and an area Sc of those regions of the surface of the toner base particle coated with the organosilicon polymer at the surface of the toner particle before and after the test, a value of Sc/S for the toner particle before the test is defined as $R_0$, and a value of Sc/S for the toner particle after the test is defined as $R_1$,
- the value of $R_0$ is 0.30 to 0.70, and
- a value of $(R_0-R_1)/R_0$ is 0.20 or less; and
- a storage elastic modulus at 100° C. of a disc-like specimen obtained by compression molding the toner into a disc-like shape is 8000 to 50,000 Pa.

The inventors of the present invention found that by constituting in the manner described above, it was possible to improve rubbing fixability while suppressing mottle even if the toner has a toner particle containing an organosilicon polymer that coats a toner base particle. A detailed mechanism is unclear, but is surmised to be as follows by the inventors of the present invention.

In order to suppress mottle, toner deformation at the time of fixing must be kept to a minimum. In a toner having a toner particle containing an organosilicon polymer that coats a toner base particle, two approaches have been considered in order to keep toner deformation to a minimum at the time of fixing.

A first approach is a method comprising hardening a toner base particle in a fixation temperature region. However, in cases where toner durability is improved by increasing the coverage ratio of the organosilicon polymer at the surface of the toner base particle, binding between toner particles is weakened by the organosilicon polymer at the surface. Therefore, this method is not suitable due to leading to a decrease in rubbing fixability.

A second approach is a method comprising keeping toner deformation to a minimum at the time of fixing by utilizing the hardness of the organosilicon polymer.

In this case, it is possible to soften the toner base particle while keeping toner deformation to a minimum. Therefore, it is thought that toner base particles are wetted and spread after being melted by heat, meaning that rubbing fixability can be improved.

That is, the toner comprises a toner particle comprising: a toner base particle comprising a binder resin; and an organosilicon polymer at a surface of the toner base particle. For example, the toner particle comprises an organosilicon polymer on the surface of the toner base particle.

In addition, the organosilicon polymer forms a protruded portion at the surface of the toner base particle. For example, the organosilicon polymer forms a protruded portion on the surface of the toner base particle. That is, protruded portions constituted from the organosilicon polymer are present at the surface of the toner base particle.

In addition, when the toner particle and a magnetic carrier are placed in a container, a test is carried out by subjecting the container to reciprocating shaking for a period of 10 hours at a stroke rate of 150/min, a stroke width of 80 mm and a shaking angle of 90° using a reciprocating shaker (also referred to as a carrier shaking method hereinafter), and the toner particle is measured in terms of a total area S of a surface of the toner particle and an area Sc of those regions of the surface of the toner base particle coated with the organosilicon polymer at the surface of the toner particle before and after the test, a value of Sc/S for the toner particle before the test is defined as $R_0$ and a value of Sc/S for the toner particle before the test is defined as $R_1$, the value of $R_0$ is 0.30 to 0.70. In addition, a value of $(R_0-R_1)/R_0$ is 0.20 or less. The value of Sc/S indicates the coverage ratio of the toner particle surface by the organosilicon polymer. If the value of $R_0$ exceeds 0.70, the hardness of the toner particle tends to increase, but because the coverage ratio of the toner particle surface by the organosilicon polymer is too high even if the toner base particle is softened, sufficient binding between toner particles cannot be achieved. Meanwhile, if the value of $R_0$ is less than 0.30, the hardness of the toner particle cannot be sufficiently increased by the organosilicon polymer.

The value of $R_0$ is preferably 0.35 to 0.70, more preferably 0.40 to 0.70, further preferably 0.45 to 0.70, particularly preferably 0.50 to 0.70, and especially preferably 0.55 to 0.65. If the value of $R_0$ falls within the range mentioned above, the hardness of the toner particle can be suitably increased, and the durability and rubbing fixability of the toner can be improved in a good balance with suppression of mottle.

The value of $R_0$ can be adjusted by adjusting the holding time, the added number of parts of organosilicon compound or organosilicon compound hydrolyzate used in the condensation polymerization reaction, and so on.

As mentioned above, the value of $(R_0-R_1)/R_0$ is 0.20 or less. The value of $(R_0-R_1)/R_0$ indicates the degree of reduction in the value of Sc/S before and after a test. The value of $(R_0-R_1)/R_0$ is preferably 0.16 or lower, more preferably 0.11 or lower, and further preferably 0.08 or lower. The lower limit for the value of $(R_0-R_1)/R_0$ is not particularly limited, but is generally 0.00 or more, and may be 0.01 or more, 0.02 or more, or 0.04 or more. For example, the value of $(R_0-R_1)/R_0$ is 0.00 to 0.20, 0.01 to 0.16, 0.02 to 0.11 or 0.04 to 0.08.

In a test using a carrier shaking method in the present disclosure, a magnetic carrier, which is used in a two-component developer for electrophotography, and toner particles are placed in a container and shaken, $R_0$ and $R_1$ are measured, and the degree of reduction in the value of Sc/S of the toner particles before and after the test is determined. Details of the test using a carrier shaking method are described later.

When the magnetic carrier and the toner particles are shaken in the same container, the toner particles undergo deformation caused by pressure. During this process, strain occurs at an interface between an organosilicon polymer and a toner base particle. As a result, the organosilicon polymer does not become detached in cases where the organosilicon polymer and the toner base particle are strongly bound to each other, but in cases where the organosilicon polymer and the toner base particle are weakly bound to each other, the organosilicon polymer becomes detached and the value of Sc/S decreases. The inventors of the present invention found that the degree of reduction in the value of Sc/S in this case has a strong correlation with the hardness of the organosilicon polymer when the toner is fixed.

That is, if the value of $(R_0-R_1)/R_0$ falls within the range mentioned above, this shows that there is strong binding between the organosilicon polymer and the toner base particle. As a result, even if the toner particle undergoes deformation when the toner is fixed, the organosilicon polymer is unlikely to become detached from the toner base particle, and the hardness of the organosilicon polymer can be maintained. As a result of this hardness, it is possible to increase the durability of the toner and suppress mottle.

Meanwhile, if the value of $(R_0-R_1)/R_0$ exceeds 0.20, this shows that there is weak binding between the organosilicon polymer and the toner base particle. As a result, if the toner particle undergoes deformation when the toner is fixed, the organosilicon polymer is likely to become detached from the toner base particle, and the hardness of the organosilicon polymer is lost.

The value of $(R_0-R_1)/R_0$ can be controlled by adjusting the type or amount of organosilicon compound segment in the toner base particle, adjusting the coverage ratio of the toner base particle surface by the organosilicon polymer, and so on. For example, the value of $(R_0-R_1)/R_0$ can be controlled by forming a component having high affinity for the organosilicon polymer as an intermediate layer on the surface layer of the toner base particle or by adjusting the type or quantity of a component used when forming the intermediate layer.

The storage elastic modulus at 100° C. of a disc-like specimen obtained by compression molding the toner into a disc-like shape is 8000 to 50,000 Pa. This storage elastic modulus indicates the storage elastic modulus of the toner at 100° C. In addition, this storage elastic modulus is preferably 8100 to 49,500 Pa, more preferably 15,000 to 45,000 Pa, and further preferably 28,500 to 44,200 Pa. If the storage elastic modulus falls within the range mentioned above, it is possible to improve rubbing fixability and suppress ejected paper sticking.

In addition, the storage elastic modulus can be adjusted by adjusting the coverage ratio of the organosilicon polymer, the mass ratio of the organosilicon polymer relative to the toner, or the storage elastic modulus of the toner base particle.

By satisfying all of the requirements mentioned above, it is possible to improve the durability and rubbing fixability of the toner in a good balance with suppression of mottle.

Preferred embodiments relating to the toner of the present disclosure will now be explained. Moreover, preferred embodiments are not limited to these details.

The organosilicon polymer that forms protruded portions is preferably a condensation polymerization product of an organosilicon compound having a structure represented by Formula (Y) below. In addition, a condensation polymerization product of a hydrolyzate of an organosilicon compound having a structure represented by Formula (Y) below is more preferred.

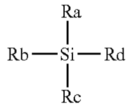

(Y)

[In Formula (Y), Ra denotes a hydrocarbon group (and preferably an alkyl group) having 1 to 6 carbon atoms, and Rb, Rc and Rd each independently denote a halogen atom, a hydroxyl group, an acetoxy group or an alkoxy group. Ra is preferably an aliphatic hydrocarbon group having 1 to 3 carbon atoms, and is more preferably a methyl group.]

Rb, Rc and Rd are each independently a halogen atom, a hydroxyl group, an acetoxy group or an alkoxy group (hereinafter referred to as reactive groups). These reactive groups undergo hydrolysis and/or condensation polymerization to form crosslinked structures.

In addition, hydrolysis of Rb, Rc and Rd and condensation polymerization can be controlled by adjusting the reaction temperature, the reaction time, the reaction solvent and the pH. In order to obtain the organosilicon polymer used in the present disclosure, it is possible to use an organosilicon compound having three reactive groups (Rb, Rc and Rd) in the molecule, excluding Ra in Formula (Y) above (hereinafter referred to as a "trifunctional silane"), or a combination of a plurality of these compounds.

Hydrolysis conditions are not particularly limited, but a pH of 2.0 to 6.0, a temperature of 30 to 70° C. and a time of 2 to 5 hours are preferred.

Examples of compounds represented by Formula (Y) above include those listed below.

Trifunctional methylsilane compounds such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane and methyldiethoxyhydroxysilane.

Trifunctional silane compounds such as ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane and hexyltrihydroxysilane.

Trifunctional phenylsilane compounds such as phenyltrimethoxysilane, phenyltriethoxysilane, phenyltrichlorosilane, phenyltriacetoxysilane and phenyltrihydroxysilane.

Of these, the organosilicon polymer preferably has a T3 structure represented by Formula (3) below. In this case, because the molecular structure of the organosilicon polymer extends in three directions, the durability of the organosilicon polymer is improved and the durability of the toner is therefore improved, which is desirable. An organosilicon polymer having a T3 structure can be obtained by hydrolyzing and condensing an alkoxysilane having three alkoxy groups.

$$R—SiO_{3/2} \quad (3)$$

(In Formula (3), R denotes an alkyl group having 1 to 10 (preferably 1 to 8, and more preferably 1 to 6) carbon atoms or a phenyl group.)

Cases where R in Formula (3) is an alkyl group or a phenyl group are preferred from the perspective of improved charge rising performance. Examples of alkoxysilanes able to yield this type of structure include those listed below. Moreover, it is possible to use one of these alkoxysilanes in isolation, or a combination of two or more types thereof.

Methyltrimethoxysilane, ethyltrimethoxysilane, propyltrimethoxysilane, butyltrimethoxysilane, pentyltrimethoxysilane, hexyltrimethoxysilane, phenyltrimethoxysilane, octyltrimethoxysilane, decyltrimethoxysilane and vinyltriethoxysilane.

The reason why cases where R in Formula (3) is an alkyl group or a phenyl group are preferred from the perspective of improved charge rising performance is thought to be as follows. In cases where a siloxane bond contains an alkyl group or a phenyl group, it is thought that charge is held in the alkyl group or phenyl group portion and the charge holding capacity of the organosilicon polymer is improved.

It is known that in condensation polymerization reactions of alkoxysilanes, the bonding form of generated siloxane bonds generally differs according to the acidity of an aqueous medium that is a reaction medium.

Specifically, in a case where an aqueous medium is acidic, a hydrogen ion ($H^+$) is electrophilically added to one reactive group (for example, oxygen in an alkoxy group; an —OR group). Next, an oxygen atom in a water molecule coordinates to a silicon atom, and a silanol group is formed by a substitution reaction. In a case where a sufficient amount of water is present, because one $H^+$ acts on one reactive group (for example, oxygen in an alkoxy group; an —OR group), if the content of $H^+$ in the aqueous medium is low, the electrophilic addition to the reactive medium is slow and the substitution reaction to a silanol group is slow. Therefore, in this case, all silane-bonded reactive groups undergo a condensation polymerization reaction prior to hydrolysis, and one-dimensional linear polymers or two-dimensional polymers tend to be produced relatively easily.

Meanwhile, in a case where a medium is alkaline, a hydroxide ion is added to silicon to produce a 5-coordinated intermediate. Therefore, all reactive groups (for example, alkoxy groups; —OR groups) are readily detached and are easily substituted by silanol groups. In particular, in a case where a silicon compound having 3 or more reactive groups is used in the same silane, hydrolysis and condensation polymerization occur three dimensionally and an organosilicon polymer having a large number of three-dimensional crosslinking bonds is formed. In addition, the reaction is completed in a short time.

Furthermore, because the condensation polymerization reaction of the alkoxysilane starts with a solution and forms a material by gelling the solution, it is possible to produce a variety of fine structures and shapes. Therefore, by controlling reaction conditions of the condensation polymerization (addition time, temperature, pH, holding time, and so on), it is easy to control the coverage ratio to a value stipulated in the present disclosure.

Reaction conditions for the condensation polymerization reaction are not particularly limited as long as other requirements are satisfied, but it is preferable to carry out this reaction in two separate stages. By carrying out the reaction in two separate stages, it is easy to control the value of $R_0$ and the value of $(R_0-R_1)/R_0$ to desired values.

In the first stage condensation polymerization reaction, the added quantity of organosilicon compound is preferably 1.0 to 12.0 parts by mass, more preferably 1.5 to 10.0 parts by mass, and further preferably 2.0 to 8.0 parts by mass, relative to 100 parts by mass of the toner base particle.

In addition, the organosilicon compound is preferably added over a period of 1 to 150 minutes, and more preferably over a period of 1 to 120 minutes.

Furthermore, a first preset pH, which is the pH of the aqueous medium in the first stage condensation polymerization reaction, is preferably 4.5 to 12.0, and more preferably 5.0 to 11.5.

In addition, the length of time for which the first preset pH is maintained in the first stage condensation polymerization reaction is preferably 25 to 330 minutes, and more preferably 30 to 300 minutes.

A second preset pH, which is the pH of the aqueous medium in the second stage condensation polymerization reaction, is preferably 8.5 to 11.0, and more preferably 9.0 to 10.0. In addition, the length of time for which the second preset pH is maintained in the second stage condensation polymerization reaction is preferably 110 to 330 minutes, and more preferably 120 to 300 minutes.

By using these conditions, the value of $R_0$ and the value of $(R_0-R_1)/R_0$ can be easily controlled within the ranges mentioned above.

It is preferable for the toner base particle to be able to be strongly joined to the organosilicon polymer. One example of a means enabling for the toner base particle to be strongly joined to the organosilicon polymer is to increase the coverage ratio of the organosilicon polymer. As a result, the organosilicon polymer can be strongly bound to a toner base particle in a single toner particle. In addition, it is possible to increase the binding strength even if the shape of the organosilicon polymer is changed. Specifically, in comparison with a case where a toner base particle is simply coated in the form of discrete islands even at the same coverage ratio, a case where networks are formed as a mesh is less likely to cause the organosilicon polymer to become detached from the toner base particle.

In addition, the toner base particle preferably has an organosilicon compound segment, and more preferably contains a condensation product of an organosilicon compound. The organosilicon compound segment is, for example, a monomer unit having organic silicon introduced in a binder resin (or a condensation product of an organosilicon compound). The organosilicon compound segment preferably contains at least one type selected from the group consisting of organosilicon compounds and condensation products of organosilicon compounds.

In addition, in order for the toner base particle to have an organosilicon compound segment, it is preferable to form an intermediate layer at the surface of the toner base particle using, for example, a component having high affinity for the organosilicon polymer. That is, it is preferable for the toner particle to comprise an intermediate layer at the surface of the toner base particle. In order to form the intermediate layer, it is preferable to use, for example, a trifunctional silane compound having an acryloxyalkyl group or methacryloxyalkyl group as a substituent group, a difunctional silane compound having an acryloxyalkyl group or methacryloxyalkyl group, or the like. In this way, an intermediate layer is formed at the surface of the toner base particle, and the toner base particle is strongly bound to the organosilicon polymer. As a result, it becomes easier to make the value of $(R_0-R_1)/R_0$ fall within the desired range. A toner base particle that has been modified by providing an intermediate layer is encompassed by the toner base particle.

Examples of trifunctional silane compounds include those listed below.

Trifunctional silane compounds having a methacryloxyalkyl group as a substituent group, such as 3-methacryloxypropyltrimethoxysilane, 3-methacryloxypropyltriethoxysilane, 3-methacryloxyoctyltrimethoxysilane, 3-methacryloxypropyldiethoxymethoxysilane, 3-methacryloxypropylethoxydimethoxysilane and 3-methacryloxypropyl-tris(trimethylsiloxy)silane; Trifunctional silane compounds having an acryloxyalkyl group as a substituent group, such as 3-acryloxypropyltrimethoxysilane, 3-acryloxypropyltriethoxysilane, 3-acryloxyoctyltrimethoxysilane, 3-acryloxypropyldiethoxymethoxysilane, 3-acryloxypropylethoxydimethoxysilane.

Examples of difunctional silane compounds include those listed below.

Difunctional silane compounds having a methacryloxyalkyl group as a substituent group, such as 3-methacryloxypropylmethyldimethoxysilane, 3-methacryloxypropyldiethoxymethylsilane, 3-methacryloxypropylethyldimethoxysilane, 3-methacryloxypropylethyldiethoxysilane and 3-methacryloxypropylethoxymethylmethoxysilane; Difunctional silane compounds having an acryloxyalkyl group as a substituent group, such as 3-acryloxypropylmethyldimethoxysilane, 3-acryloxypropyldiethoxymethylsilane, 3-acryloxypropylethyldimethoxysilane, 3-acryloxypropylethyldiethoxysilane and 3-acryloxypropylethoxymethylmethoxysilane.

In a case where an intermediate layer is formed on the toner base particle, silicon corresponding to the intermediate layer is detected at the surface of the toner base particle in an observation of a cross section of the toner using TEM-EDX. In addition, the degree of modification of the toner base particle can be confirmed by the thickness of the intermediate layer. Silicon corresponding to this intermediate layer can be differentiated from silicon corresponding to the organosilicon polymer from the shape of a toner image observed using TEM-EDX. A detailed measurement method is described later.

The thickness of the intermediate layer is preferably 3 to 46 nm, more preferably 4 to 42 nm, further preferably 10 to 38 nm, and particularly preferably 15 to 35 nm. If this thickness falls within the range mentioned above, an intermediate layer is satisfactorily formed at the surface of the toner base particle, and the toner base particle is strongly bound to the organosilicon polymer. As a result, it becomes easier to make the value of $(R_0-R_1)/R_0$ fall within the desired range. In addition, the thickness of the intermediate layer can be controlled by controlling the formulated quantity of the material that forms the intermediate layer.

The added quantity of an intermediate layer component used for forming the intermediate layer is not particularly limited, but is preferably 0.01 to 1.00 parts by mass, more preferably 0.02 to 0.50 parts by mass, and further preferably 0.03 to 0.30 parts by mass, relative to 100 parts by mass of the toner base particle. If this added quantity falls within the range mentioned above, the intermediate layer can be advantageously formed.

An example of a method for forming the intermediate layer is a method comprising adding a Si-containing monomer such as a silane coupling agent during the toner base particle polymerization step (for example, in the latter half of the polymerization step) so as to incorporate silicon in the toner base particle. Another example is a method comprising polymerizing a silane coupling agent in an aqueous medium in which toner base particles are dispersed so as to incorporate silicon in the toner base particle. By forming the intermediate layer in this way, it is possible to dispose a component having high affinity for the organosilicon polymer at a high density at the outermost layer of the toner base particle, and cohesive strength between the organosilicon polymer and the toner base particle is dramatically increased.

The organosilicon compound segment contained in the toner base particle may be contained as a part of a resin such as a binder resin contained in a base particle. For example, a binder resin may contain a structure represented by Formula (4) below. By polymerizing a trifunctional silane coupling agent having a methacryloxyalkyl group, or the like, together with a monomer of a styrene acrylic resin, it is possible to obtain a structure represented by Formula (4). For example, it is preferable to form a toner base particle having a styrene acrylic resin as a binder resin by means of suspension polymerization or the like, and then add a trifunctional silane coupling agent having a methacryloxyalkyl group and carry out polymerization.

It is thought that the structure represented by Formula (4) has high affinity due to containing the same $-SiO_{3/2}$ structure as the organosilicon polymer that is contained as a primary component of a protruded portion.

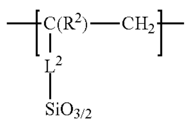

(4)

(In Formula (4), $L^2$ denotes $-COO(CH_2)_n-$ (n denotes an integer of 1 to 10 (and preferably 2 to 8)), and a carbonyl group in $L^2$ bonds to a carbon atom in the main chain (a carbon atom having $R^2$). $R^2$ denotes a hydrogen atom or a methyl group.)

In a case where the toner particle comprises an intermediate layer at the surface of the toner base particle, the organosilicon polymer more preferably contains 3-methacryloxypropyltrimethoxysilane or 3-methacryloxypropyltriethoxysilane as a constituent monomer. In cases where the organosilicon polymer contains these components as constituent monomers, the intermediate layer component binds more strongly to the organosilicon polymer. This is thought to be because the organosilicon polymer binds more strongly to the intermediate layer formed on the toner base particle because both vinyl groups and alkoxysilyl groups are present in the organosilicon polymer.

Positive measurements in TOF-SIMS can confirm that the organosilicon polymer contains 3-methacryloxypropyltrimethoxysilane or 3-methacryloxypropyltriethoxysilane as a constituent monomer. A peak at m/z=247 is obtained in a case where 3-methacryloxypropyltrimethoxysilane is contained, and a peak at m/z=289 is obtained in a case where 3-methacryloxypropyltriethoxysilane is contained.

That is, a peak is preferably detected at m/z=247 or m/z=289 in TOF-SIMS positive measurements of the surface of the toner particle.

In order to obtain this type of organosilicon polymer, 3-methacryloxypropyltrimethoxysilane or 3-methacryloxypropyltriethoxysilane should be blended as an additional component beforehand with an organosilicon compound when the organosilicon polymer is obtained by polymerizing the organosilicon compound.

The toner base particle comprises a binder resin. Materials other than the binder resin in the toner base particle are not particularly limited, and well-known materials can be used. For example, homopolymers of aromatic vinyl compounds and substituted products thereof, such as polystyrene and polyvinyltoluene; copolymers of aromatic vinyl compounds, such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers and styrene-maleic acid ester copolymers; homopolymers of aliphatic vinyl compounds and substituted products thereof, such as polyethylene and polypropylene; vinyl resins such as poly(vinyl acetate), poly(vinyl propionate), poly(vinyl benzoate), poly(vinyl butyrate), poly(vinyl formate) and poly(vinyl butyral); vinyl ether-based resins; vinyl ketone-based resins; acrylic polymers, methacrylic polymers; silicone resins; polyester resins; polyamide resins; epoxy resins; phenolic resins; rosins, modified rosins, terpene resins, and so on, can be used as materials of the binder resin contained in the toner base particle.

It is possible to use one of these polymerizable monomers in isolation or a combination of a plurality of types thereof.

Examples of polymerizable monomers that form copolymers of aromatic vinyl compounds include those listed below. That is, styrene and styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene.

Examples of polymerizable monomers that form acrylic polymers include acrylic polymerizable monomers such as acrylic acid, methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate and 2-benzoyloxyethyl acrylate.

Examples of polymerizable monomers that form methacrylic polymers include methacrylic polymerizable monomers such as meth acrylic acid, methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate and dibutyl phosphate ethyl methacrylate.

Resins obtained through condensation polymerization of carboxylic acid components and alcohol components listed below can be used as the polyester resin. Examples of the carboxylic acid component include terephthalic acid, isophthalic acid, phthalic acid, fumaric acid, maleic acid, cyclohexanedicarboxylic acid and trimellitic acid. Examples of the alcohol component include bisphenol A, hydrogenated bisphenols, ethylene oxide adducts of bisphenol A, propylene oxide adducts of bisphenol A, glycerin, trimethylolpropane and pentaerythritol.

In addition, the polyester resin may be a urea group-containing polyester resin. A resin in which a carboxyl group at a terminal or the like has not been capped (substituted by another substituent group) is preferred as the polyester resin.

In order to ameliorate changes in viscosity of a toner at high temperatures, the toner base particle may have a polymerizable functional group. Examples of polymerizable functional groups include vinyl groups, isocyanate groups, epoxy groups, amino groups, carboxyl groups and hydroxyl groups.

Of these, styrene, styrene derivatives, acrylic polymerizable monomers and methacrylic polymerizable monomers are particularly preferred. That is, the binder resin preferably contains a vinyl resin, and preferably contains a styrene acrylic resin from perspectives such as developing characteristics and fixing performance. Moreover, the method for producing the polymer is not particularly limited, and a well-known method can be used.

The binder resin preferably has a monomer unit represented by Formula (1) below. The content ratio of the monomer unit represented by Formula (1) in the binder resin is preferably 5.0 to 35.0 mass %, more preferably 7.0 to 33.0 mass %, and further preferably 8.0 to 30.0 mass %. In cases where the content ratio of the monomer unit represented by Formula (1) falls within the range mentioned above, it is possible to suppress ejected paper sticking. This is thought to be because when the organosilicon polymer and the toner base particle are cooled after fixing, hardening of molten toner base particles is facilitated because of high affinity between the organosilicon polymer at the surface of the toner base particle and the alkyl chain in the monomer unit represented by Formula (1).

(1)

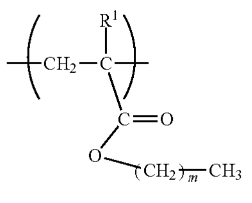

(In Formula (1), $R^1$ denotes a hydrogen atom or a methyl group, and m denotes an integer of 3 to 30 (preferably 6 to 25, more preferably 10 to 22, and further preferably 10 to 12). $R^1$ is preferably a hydrogen atom.)

By constituting in this way, it is possible to obtain a toner able to achieve a balance between improving rubbing fixability and suppressing mottle even if an organosilicon polymer is used at the surface of a toner base particle. If the alkyl chain length exceeds the range mentioned above and becomes too long, toner productivity decreases.

An example of a method for introducing the monomer unit represented by Formula (1) is a method comprising subjecting (meth)acrylic acid esters such as those listed below to vinyl polymerization.

For example, monomers such as (meth)acrylic acid esters having a linear alkyl group with 4 to 31 carbon atoms [butyl (meth)acrylate, pentyl (meth)acrylate, hexyl (meth)acrylate, heptyl (meth)acrylate, octyl (meth)acrylate, nonyl (meth) acrylate, decyl (meth)acrylate, lauryl (meth)acrylate, myristyl (meth)acrylate, palmityl (meth)acrylate, and the like], and (meth)acrylic acid esters having a branched alkyl group with 5 to 31 carbon atoms [ethylhexyl (meth)acrylate and the like].

The monomer unit represented by Formula (1) may be a single monomer unit or a combination of two or more types.

The binder resin may also have other monomer units in addition to the monomer unit represented by Formula (1) above. An example of a method for introducing another monomer unit is a method comprising polymerizing a monomer that forms the monomer unit represented by Formula (1) above and a polymerizable monomer listed above.

The binder resin preferably has a monomer unit represented by Formula (2) below. The content ratio of the monomer unit represented by Formula (2) in the binder resin is preferably 50.0 to 90.0 mass %, more preferably 60.0 to 82.0 mass %, and further preferably 65.0 to 80.0 mass %. If this content ratio falls within the range mentioned above, it is possible to obtain a toner having excellent fixing performance.

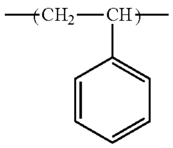

(2)

When the toner particle is subjected to processes of treatments (i) to (iii) below in this order, a storage elastic modulus at 100° C. of a disc-like specimen obtained by compression molding an obtained toner base particle into a disc-like shape is defined as G'base(100), a value of G'base (100) is preferably 1600 to 24,000 Pa. G'base(100) indicates the storage elastic modulus of the toner base particle at 100° C.

Treatment (i): The toner particle is dispersed in an aqueous solution of sodium hydroxide having a pH of 13.5 to obtain an aqueous dispersion of the toner particles.

Treatment (ii): The aqueous dispersion of the toner particle is heated to 55° C. and stirred for 3 hours at 150 rpm using a magnetic stirrer.

Treatment (iii): The aqueous dispersion treated in treatment (ii) is subjected to vacuum filtration, washed 5 times with RO water, and then dried for 24 hours at 40° C. using a vacuum dryer.

The value of G'base(100) is preferably 1800 to 21,500 Pa, more preferably 2000 to 20,000 Pa, and further preferably 2200 to 18,000 Pa. If this value falls within the range mentioned above, low-temperature fixability can be improved. The value of G'base(100) can be adjusted by adjusting the Tg value or degree of crosslinking of the binder resin contained in the toner particle. For example, in the case of a styrene acrylic resin, it is possible to adjust the Tg value by altering the styrene/acrylic quantity ratio, and it is possible to adjust the degree of crosslinking by adding a crosslinkable material, such as 1,6-hexane diol diacrylate. Details of a method for measuring G'base(100) are described later.

The toner particle preferably has a core-shell structure comprising a core particle and a shell formed on a surface of the core particle. In addition, it is more preferable for the core particle to comprise the binder resin and the shell to comprise the organosilicon polymer.

A toner particle having this type of core-shell structure can achieve a balance between improving rubbing fixability and suppressing mottle to a high degree. It is possible to use a well-known method, such as a wet production method, in order to impart the toner particle with a core-shell structure.

Preferred embodiments relating to the toner of the present disclosure will now be explained. Moreover, preferred embodiments are not limited to these details.

Waxes will now be described.

The toner particle can contain a wax if necessary. If the toner particle contains a wax, low-temperature fixability can be improved because release properties are further improved and the toner particle softens. Examples of waxes include those listed below.

Aliphatic hydrocarbon-based waxes such as low molecular weight polyethylene, low molecular weight polypropylene, microcrystalline waxes, Fischer Tropsch waxes and paraffin waxes; oxides and block copolymers of aliphatic hydrocarbon-based waxes such as oxidized polyethylene waxes; waxes containing mainly fatty acid esters, such as carnauba wax and montanic acid ester waxes; waxes obtained by partially or completely deoxidizing fatty acid esters, such as deoxidized carnauba wax; saturated straight chain fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, ceryl alcohol and melissyl alcohol; polyhydric alcohols such as sorbitol; fatty acid amides such as linolic acid amide, oleic acid amide and lauric acid amide; saturated fatty acid bisamides such as methylene-bisstearic acid amide, ethylene-biscapric acid amide, ethylene-bislauric acid amide and hexamethylene-bisstearic acid amide; unsaturated fatty acid amides such as ethylene-bisoleic acid amide, hexamethylene-bisoleic acid amide, N,N'-dioleyladipic acid amide and N,N'-dioleylsebacic acid amide; aromatic bisamides such as m-xylene-bisstearic acid amide and N,N'-distearylisophthalic acid amide; fatty acid metal salts such as calcium stearate, calcium laurate, zinc stearate and magnesium stearate (these are generally known as metal soaps); waxes obtained by grafting vinyl-based monomers, such as styrene and acrylic acid, onto aliphatic hydrocarbon-based waxes; partial esters of fatty acids and polyhydric alcohols, such as behenic acid monoglyceride; and hydroxyl group-containing methyl ester compounds obtained by hydrogenation or the like of vegetable oils. It is possible to use one of these waxes in isolation or a combination of two or more types thereof.

Examples of aliphatic alcohols that form ester waxes include 1-hexanol, 1-heptanol, 1-octanol, 1-nonanol, 1-decanol, undecyl alcohol, lauryl alcohol, myristyl alcohol, 1-hexadecanol, stearyl alcohol, arachidyl alcohol, behenyl alcohol, lignoceryl alcohol and ethylene glycol.

In addition, examples of aliphatic carboxylic acids include pentanoic acid, hexanoic acid, heptanoic acid, octanoic acid, nonanoic acid, decanoic acid, lauric acid, myristic acid, palmitic acid, stearic acid, arachidic acid, behenic acid and lignoceric acid.

The content of the wax is preferably 0.5 to 30.0 parts by mass relative to 100.0 parts by mass of the binder resin or polymerizable monomer.

Colorants will now be described.

If necessary, a colorant can be used in the toner. Colorants are not particularly limited, and it is possible to use well-known colorants such as those listed below.

Examples of yellow pigments include yellow iron oxide, Naples Yellow, Naphthol Yellow S, Hansa Yellow G, Hansa Yellow 10G, Benzidine Yellow G, Benzidine Yellow GR, Quinoline Yellow Lake, condensed azo compounds such as Permanent Yellow NCG and Tartrazine Lake, isoindolinone compounds, anthraquinone compounds, azo metal complexes, methine compounds and allylamide compounds. Specific examples thereof include those listed below.

C.I. Pigment Yellow 12, 13, 14, 15, 17, 62, 74, 83, 93, 94, 95, 109, 110, 111, 128, 129, 147, 155, 168 and 180.

Examples of orange pigments include those listed below.

Permanent Orange GTR, Pyrazolone Orange, Vulcan Orange, Benzidine Orange G, Indanthrene Brilliant Orange RK and Indanthrene Brilliant Orange GK.

Examples of red pigments include red iron oxide, Permanent Red 4R, Lithol Red, Pyrazolone Red, Watchung Red calcium salt, Lake Red C, Lake Red D, Brilliant Carmine 6B, Brilliant Carmine 3B, condensed azo compounds such as Eosine Lake pigments, Rhodamine Lake B and Alizarin Lake pigments, diketopyrrolopyrrole compounds, anthraquinone compounds, quinacridone compounds, basic dye lake compounds, naphthol compounds, benzimidazolone compounds, thioindigo compounds and perylene compounds. Specific examples thereof include those listed below.

C.I. Pigment Red 2, 3, 5, 6, 7, 23, 48:2, 48:3, 48:4, 57:1, 81:1, 122, 144, 146, 166, 169, 177, 184, 185, 202, 206, 220, 221 and 254.

Examples of blue pigments include Alkaline Blue Lake, Victoria Blue Lake, copper phthalocyanine compounds and derivatives thereof, such as Phthalocyanine Blue, metal-free Phthalocyanine Blue, partially chlorinated products of Phthalocyanine Blue, Fast Sky Blue and Indanthrene Blue BG, anthraquinone compounds and basic dye lake compounds. Specific examples thereof include those listed below.

C.I. Pigment Blue 1, 7, 15, 15:1, 15:2, 15:3, 15:4, 60, 62 and 66.

Examples of violet pigments include Fast Violet B and Methyl Violet Lake.

Examples of green pigments include Pigment Green B, Malachite Green Lake and Final Yellow Green G.

Examples of white pigments include hydrozincite, titanium oxide, antimony white and zinc sulfide.

Examples of black pigments include carbon black, aniline black, non-magnetic ferrite, magnetite, and pigments that are colored black through use of yellow colorants, red colorants and blue colorants listed above.

It is possible to use one of these colorants in isolation or a mixture of these, and these can be used in the form of solid solutions.

If necessary, colorants may be surface treated with substances that do not impair polymerization when the toner particle is produced by polymerizing a polymerizable monomer.

Moreover, the content of the colorant is preferably 1.0 to 15.0 parts by mass relative to 100.0 parts by mass of the binder resin.

Charge control agents will now be described.

If necessary, a charge control agent can be used in the toner. A well-known charge control agent can be used, and a charge control agent which has a fast triboelectric charging speed and can stably maintain a certain triboelectric charge quantity is preferred. Furthermore, in a case where a toner particle is produced using a polymerization method, a charge control agent which exhibits low polymerization inhibition properties and which is substantially insoluble in an aqueous medium is preferred.

Charge control agents include those used for imparting a toner with negative charge characteristics and those used for imparting a toner with positive charge characteristics. Examples of charge control agents that impart a toner with negative charge characteristics include those listed below.

Monoazo metal compounds, acetylacetone metal compounds, aromatic oxycarboxylic acid, aromatic dicarboxylic acid, oxycarboxylic acid and dicarboxylic acid-based metal compounds, aromatic oxycarboxylic acids, aromatic mono- and poly-carboxylic acids and metal salts, anhydrides and esters thereof, phenol derivatives such as bisphenol, urea derivatives, metal-containing salicylic acid-based compounds, metal-containing naphthoic acid-based compounds, boron compounds, quaternary ammonium salts, calixarenes and resin-based charge control agents.

Meanwhile, examples of charge control agents that impart a toner with positive charge characteristics include those listed below.

Nigrosine and nigrosine-modified fatty acid metal salts; guanidine compounds; imidazole compounds; quaternary ammonium salts such as tributylbenzyl ammonium-1-hydroxy-4-naphthosulfonic acid salts, tetrabutyl ammonium tetrafluoroborate, and analogs thereof, onium salts such as phosphonium salts, and lake pigments thereof, triphenylmethane dyes and Lake pigments thereof (examples of laking agents include phosphotungstic acid, phosphomolybdic acid, phosphotungstic-molybdic acid, tannic acid, lauric acid, gallic acid, ferricyanic acid and ferrocyanic compounds); metal salts of higher fatty acids; and resin-based charge control agents (charge control resins).

It is possible to use one of these charge control agents in isolation or a combination of two or more types thereof. Among these charge control agents, metal-containing salicylic acid-based compounds are preferred, and such compounds in which the metal is aluminum or zirconium are particularly preferred.

The added quantity of the charge control agent is preferably 0.1 to 20.0 parts by mass, and more preferably 0.5 to 10.0 parts by mass, relative to 100.0 parts by mass of the binder resin.

In addition, it is preferable to use a polymer or copolymer having a sulfonic acid group, a sulfonic acid salt group or a sulfonic acid ester group as the charge control resin. It is particularly preferable for a polymer having a sulfonic acid group, a sulfonic acid salt group or a sulfonic acid ester group to contain a monomer unit corresponding to a sulfonic acid group-containing acrylamide-based monomer or a sulfonic acid group-containing methacrylamide-based monomer at a quantity of 2 mass % or more in the charge control resin. This quantity is more preferably 5 mass % or more. The upper limit of this quantity is not particularly limited, but is preferably 10 mass % or less, and more preferably 8 mass % or less.

The charge control resin preferably has a glass transition temperature (Tg) of 35 to 90° C., a peak molecular weight (Mp) of 10,000 to 30,000, and a weight average molecular weight (Mw) of 25,000 to 50,000. In cases where a charge control resin that satisfies the ranges mentioned above is used, it is possible to impart preferred triboelectric charging characteristics without adversely affecting thermal characteristics required of the toner particle. Furthermore, in a case where the charge control resin contains a sulfonic acid group, dispersibility of the charge control resin per se in a colorant-dispersed solution and dispersibility of the colorant are improved, and tinting strength, transparency and triboelectric charging characteristics can be further improved.

External additives will now be described.

If necessary, an external additive can be used in the toner. By constituting in this way, it is possible to control, for example, fluidity, charging performance, cleaning properties, and the like.

Examples of external additives to be used include inorganic oxide fine particles comprising silica fine particles, alumina fine particles, titanium oxide fine particles, and the like; fine particles of inorganic stearic acid compounds, such as aluminum stearate fine particles and zinc stearate fine particles; and fine particles of inorganic titanate compounds such as strontium titanate and zinc titanate. It is possible to use one of these external additives in isolation or a combination of two or more types thereof.

The total added quantity of external additives is preferably 0.05 to 10.00 parts by mass, and more preferably 0.1 to 5.0 parts by mass, relative to 100 parts by mass of toner particle.

It is possible to use a well-known technique in order to fix external additives to the toner particle surface. Examples include fixing using a Henschel Mixer (a dry method) and a technique comprising dispersing toner particles and an external additive in a solvent and then fixing by aggregating (a wet method).

Production methods will now be described.

Well-known means can be used as methods for producing the toner base particle and the toner particle, and it is possible to use a dry production method, such as a kneading pulverization method, or a wet production method, such as a suspension polymerization method, a dissolution suspension method, an emulsion aggregation method or an emulsion polymerization aggregation method. In particular, a wet production method can be advantageously used from the perspectives of sharpening the particle size distribution of toner base particles, improving the average circularity of toner particles, and forming a core-shell structure.

A case in which a toner particle is produced using a suspension polymerization method, which is a wet production method, will now be described.

Detailed explanations will now be given of toner particle production example in which suspension polymerization is used, but the present disclosure is not limited to these.

In a suspension polymerization method, polymerizable monomers for producing a binder resin and, if necessary, waxes, colorants, charge control agents, crosslinking agents, polymerization initiators and other additives are uniformly dissolved or dispersed using a dispersing device such as a ball mill or an ultrasonic disperser, thereby obtaining a polymerizable monomer composition (a polymerizable monomer composition preparation step).

Examples of polymerizable monomers include those listed above as polymerizable monomers for forming a vinyl-based copolymer.

If necessary, a crosslinking agent may be added when the polymerizable monomer is polymerized in order to control the molecular weight of the binder resin.

Compounds having two or more polymerizable double bonds are mainly used as crosslinking agents. Examples thereof include the types listed below.

Aromatic divinyl compounds such as divinylbenzene and divinylnaphthalene; carboxylic acid esters having 2 double bonds, such as ethylene glycol diacrylate, diethylene glycol diacrylate, triethylene glycol diacrylate, tetraethylene glycol diacrylate, neopentyl glycol diacrylate, 1,3-butane diol diacrylate, 1,3-butylene glycol diacrylate, 1,4-butane diol diacrylate, 1,5-pentane diol diacrylate, 1,6-hexane diol diacrylate, polyethylene glycol #200, #400 and #600 diacrylates, dipropylene glycol diacrylate, polypropylene glycol diacrylate, polyester type diacrylates (MANDA produced by Nippon Kayaku Co., Ltd.) and compounds in which the aforementioned acrylates are methacrylates; divinyl compounds such as divinyl aniline, divinyl ether, divinyl sulfide and divinyl sulfone; and compounds having 3 or more vinyl groups. It is possible to use one of these compounds in isolation or a mixture of two or more types thereof.

The added quantity of the crosslinking agent is preferably 0.1 to 15.0 parts by mass relative to 100 parts by mass of polymerizable monomers.

Next, the polymerizable monomer composition is introduced into an aqueous medium that has been prepared in advance, and liquid droplets comprising the polymerizable monomer composition are formed at the size of toner base particles using a stirrer or disperser having a high shearing force (a granulation step).

It is preferable for the aqueous medium to contain a dispersion stabilizer in the granulation step in order to control the particle size of the toner base particles, sharpen the particle size distribution and suppress coalescence of toner base particles in the production process. Dispersion stabilizers are broadly divided into polymers, which generally exhibit repulsive forces through steric hindrance, and poorly water-soluble inorganic compounds, which achieve dispersion stability through electrostatic repulsive forces. Fine particles of poorly water-soluble inorganic compounds dissolve in acids and alkalis. Therefore, fine particles of poorly water-soluble inorganic compounds can be easily removed through dissolution by washing with an acid or an alkali after polymerization, and can therefore be advantageously used.

Compounds containing any of magnesium, calcium, barium, zinc, aluminum or phosphorus can be advantageously used as a dispersion stabilizer that is a poorly water-soluble inorganic compound. Compounds containing any of magnesium, calcium, aluminum or phosphorus are more preferred. Specific examples thereof include those listed below.

Magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite.

If used, a poorly water-soluble inorganic dispersing agent may be used as-is, but in order to obtain finer particles, particles of the inorganic dispersing agent can be generated in an aqueous medium. In the case of tricalcium phosphate, for example, by mixing an aqueous solution of sodium phosphate and an aqueous solution of calcium chloride under high speed stirring, it is possible to generate water-insoluble tricalcium phosphate and achieve finer and more uniform dispersion.

Organic compounds, such as poly(vinyl alcohol), gelatin, methyl cellulose, methylhydroxypropyl cellulose, ethyl cellulose, sodium carboxymethyl cellulose and starch, can also be used in the dispersion stabilizer.

The dispersion stabilizer is preferably used at a quantity of 0.1 to 20.0 parts by mass relative to 100 parts by mass of polymerizable monomers.

Furthermore, a surfactant can also be used at a quantity of 0.1 to 10.0 parts by mass relative to 100 parts by mass of polymerizable monomers in order to finely divide the dispersion stabilizer. Specifically, a commercially available non-ionic, anionic or cationic surfactant can be used. Sodium dodecyl sulfate, sodium tetradecyl sulfate, sodium pentadecyl sulfate, sodium octyl sulfate, sodium oleate, sodium laurate, potassium stearate and calcium oleate can be advantageously used.

Following the granulation step or during the granulation step, it is preferable to set the temperature to 50 to 90° C. and polymerize the polymerizable monomers contained in the polymerizable monomer composition so as to obtain a toner base particle-dispersed solution (a polymerization step).

In the polymerization step, it is preferable to carry out a stirring operation so that the temperature distribution inside the vessel is uniform. In a case where a polymerization initiator is added, the addition can be carried out at an arbitrary time over a prescribed period of time. In addition, the temperature may be increased in the latter half of the polymerization reaction in order to achieve a desired molecular weight distribution, and some of the aqueous medium may be distilled off using a distillation procedure in the latter half of the reaction or following completion of the reaction in order to remove unreacted polymerizable monomers and by-products from the system. The distillation procedure can be carried out at normal pressure or under reduced pressure.

The polymerization initiator used in the suspension polymerization method is preferably one for which the half-life period in the polymerization reaction is 0.5 to 30 hours. In addition, if a polymerization reaction is carried out using a polymerization initiator at a quantity of 0.5 to 20.0 parts by mass relative to 100 parts by mass of polymerizable monomers, it is possible to obtain a polymer having a local maximum weight average molecular weight within the range 5000 to 50,000.

An oil-soluble initiator is generally used as the polymerization initiator. Examples thereof include the types listed below.

Azo compounds such as 2,2'-azobisisobutyronitrile, 2,2'-azobis-2,4-dimethylvaleronitrile, 1,1'-azobis(cyclohexane-1-carbonitrile) and 2,2'-azobis-4-methoxy-2,4-dimethylvaleronitrile; and peroxide-based initiators such as acetylcyclohexylsulfonyl peroxide, diisopropylperoxy carbonate, decanonyl peroxide, lauroyl peroxide, stearoyl peroxide, propionyl peroxide, acetyl peroxide, tert-butylperoxy-2-ethylhexanoate, benzoyl peroxide, tert-butylperoxy isobutyrate, cyclohexanone peroxide, methyl ethyl ketone peroxide, dicumyl peroxide, tert-butyl hydroperoxide, di-tert-butylperoxide, tert-butyl peroxypivalate and cumene hydroperoxide.

A water-soluble initiator may additionally be used as a polymerization initiator if necessary, and examples thereof include those listed below.

Ammonium persulfate, potassium persulfate, 2,2'-azobis(N,N'-dimethyleneisobutyroamidine) hydrochloride, 2,2'-azobis(2-amidinopropane) hydrochloride, azobis(isobutylamidine) hydrochloride, sodium 2,2'-azobisisobutyronitrile sulfonate, ferrous sulfate and hydrogen peroxide.

It is possible to use one of these polymerization initiators in isolation or a plurality thereof, and a chain transfer agent, a polymerization inhibitor, and so on, can also be added in order to control the degree of polymerization of the polymerizable monomers.

The weight average particle diameter of the toner base particle is preferably 3.0 to 10.0 μm from the perspective of obtaining images having high precision and high resolution. The weight average particle diameter of the toner base particle, the toner particle and the toner can be measured using a pore electrical resistance method. For example, these weight average particle diameters can be measured using a "Coulter counter Multisizer 3" (produced by Beckman Coulter, Inc.).

In cases where the toner particle comprises an intermediate layer at the surface of the toner base particle, formation of the intermediate layer at the surface of the toner base particle is carried out on the thus obtained toner base particle-dispersed solution. The intermediate layer can be formed by adding a polymerizable material that forms the intermediate layer to the toner base particle-dispersed solution and adding a polymerization initiator. As a result, the material that forms the intermediate layer coats the surface of the toner base particle. Hereinafter, a toner base particle whose surface has been coated with the material that forms the intermediate layer is also referred to as a toner base particle, as mentioned above.

A toner particle is obtained by adding an alkoxysilane, which is a monomer for forming the organosilicon polymer, to the thus obtained toner base particle-dispersed solution, carrying out condensation polymerization at an appropriate temperature and pH for an appropriate reaction time, thereby forming the organosilicon polymer at the surface of the toner base particle. At this stage, additional components may be added to the organosilicon compound following addition of the monomer for forming the organosilicon polymer.

The thus obtained toner particle-dispersed solution is subjected to a filtration step for effecting solid-liquid separation into toner particles and the aqueous medium.

The solid-liquid separation for obtaining toner particles from the obtained toner particle-dispersed solution can be carried out using an ordinary filtration method, and it is preferable to subsequently carry out re-slurrying or further washing with washing water or the like in order to remove foreign matter that could not be completely removed from the toner particle surface. After sufficient washing, a toner cake is obtained by carrying out solid-liquid separation again. The toner cake is then dried using a well-known drying method, and particles having diameters other than a prescribed diameter are separated by means of classification if necessary, thereby obtaining toner particles. Thus separated particles having diameters other than a prescribed diameter may be reused in order to improve the final yield.

Developers will now be described.

The toner can be used as a magnetic or non-magnetic single component developer, but may be used as a two-component developer by being mixed with a carrier.

For example, magnetic particles comprising well-known materials, such as metals such as iron, ferrite and magnetite, and alloys of these metals with metals such as aluminum and lead, can be used as carriers. Among these, it is preferable to use ferrite particles. In addition, the carrier may be a coated carrier obtained by coating the surface of a magnetic particle with a coating agent such as a resin, or a resin-dispersed carrier obtained by dispersing a fine powder of a magnetic body in a binder resin.

The volume average particle diameter of the carrier is preferably 15 to 100 μm, and more preferably 25 to 80 μm.

Methods for measuring physical properties relating to the present disclosure will now be described.

Method for Measuring Storage Elastic Modulus of Disc-Like Specimen

Storage elastic modulus measurements are carried out using a MCR302 (produced by Anton Paar GmbH).

A disc-like specimen having a diameter of 8 mm and a thickness of 2.3±0.2 mm is obtained by weighing out 120 mg of a toner and compression molding for 1 minute at room temperature (25° C.) at 20 kN using a tablet molding device. The obtained disc-like specimen is set on a measurement jig under the following conditions.

Measurement jig: Measuring plate PP08/SD: 8 mm sand-blasted

Setting conditions: 80° C., 0.1 N

Next, viscoelasticity measurements are carried out under the following conditions.

Measurements are carried out for 30 minutes at a frequency of 1 Hz and a normal force of 100 mN by increasing the temperature from 70° C. to 130° C. at a temperature increase rate of 2° C./min while altering the applied strain from 0.5% to 7.0% at a rate of 0.22%/min. Here, the sampling pitch is 1 point/0.5 min.

The calculated storage elastic modulus value at 100° C. in the measurements described above is taken to be the storage elastic modulus at 100° C. of the disc-like specimen.

Method for Measuring G'Base(100)

In order to attain the storage elastic modulus at 100° C. of the toner base particle, the toner particle is treated by carrying out the following steps (i) to (iii) in this order.

Treatment (i): 20 g of RO water is weighed out into a container equipped with a stirrer chip and adjusted to a temperature of 25° C. The pH is adjusted to 13.5 using a 2 M aqueous solution of sodium hydroxide, one droplet of Contaminon N (produced by FUJIFILM Wako Pure Chemical Corporation) is added, and 2.0 g of toner particles is added. An aqueous dispersion of toner particles is obtained by carrying out a dispersion treatment for 5 minutes at an output power of 20% using an ultrasonic homogenizer (a VP-050 produced by TAITEC).

Treatment (ii): The aqueous dispersion of toner particles obtained in treatment (i) is heated to a temperature of 55° C. and stirred for 3 hours at 150 rpm using a magnetic stirrer.

Treatment (iii): The aqueous dispersion treated in treatment (ii) is subjected to vacuum filtration, washed 5 times with 40 g of RO water, and then dried for 24 hours at 40° C. using a vacuum dryer.

Using the toner base particles obtained in the steps above, a disc-like specimen was molded and measured in the same way as in the method described above for measuring the storage elastic modulus of the disc-like specimen. The calculated value at 100° C. is taken to be the storage elastic modulus at 100° C. of the toner base particle.

Method for Detecting Silicon Corresponding to Intermediate Layer

In order to evaluate whether silicon corresponding to the intermediate layer is detected at the surface of the toner base particle, cross-sectional TEM-EDX observations (energy dispersion type X-Ray analysis using a transmission electron microscope) are used. A toner is used as a TEM observation subject hereinafter, but the observation subject may also be a toner particle.

A toner cross section to be observed using the TEM is prepared in the manner described below.

First, a toner is scattered on a cover glass (produced by Matsunami Glass Ind., Ltd.; square cover glass; Square No. 1) so as to form a single layer, and an Os film (5 nm) and a naphthalene film (20 nm) are applied as protective films to the toner particles using an osmium plasma coater (OPC80T produced by filgen).

Next, a PTFE tube (internal diameter Φ 1.5 mm×external diameter Φ3 mm×3 mm) is filled with a photocurable resin D800 (produced by JEOL Ltd.), and the cover glass is gently placed on the tube in an orientation whereby the toner is in contact with the photocurable resin D800. The resin is cured by being irradiated with light in this state, after which the cover glass and the tube are removed so as to form a cylindrical resin having the toner embedded in the outermost surface thereof.

Using an ultrasonic ultramicrotome (a UC7 produced by Leica), a length corresponding to the radius of the toner (for example, 4.0 μm in a case where the weight average particle diameter (D4) is 8.0 μm) is cut from the outermost surface of the cylindrical resin at a cutting speed of 1 mm/s, thereby exposing a cross section of the central part of the toner.

Next, a toner cross section is prepared by cutting at a film thickness of 100 nm.

The obtained cross section is then subjected to STEM-EDX observations using a STEM function of a TEM-EDX (TEM: JEM2800 (200 keV) produced by JEOL, EDX: detector: Dry SD 100GV produced by JEOL, EDX system: NORAN SYSTEM 7 produced by Thermo Fisher). The STEM probe size is 1.0 nm, the observation magnification is 150 k, the EDX image size is 256×256 pixel, the storage rate is 10,000 cps, and data is acquired by accumulating 100 frames.

From the obtained image, a toner base particle and a protruded portion constituted from the organosilicon polymer at the surface of the toner base particle can be differentiated by the shape thereof and the silicon detection intensity. That is, it can be confirmed from obtained TEM observation results that a protruded portion constituted from the organosilicon polymer is present. In addition, the toner base particle can be differentiated from the organosilicon polymer by the TEM contrast also. Specifically, it can be confirmed that a protruded portion constituted from the organosilicon polymer is present by showing contrast similar to that of TEM-EDX observations of commercially available organosilicon polymers.

In cases where the toner contains both an organosilicon polymer and silica fine particles, the organosilicon polymer is identified by comparing the ratio (Si/O ratio) of Si and O element content values (atomic %). Standard samples of an organosilicon polymer and silica fine particles are subjected to TEM-EDX analysis under the same conditions, and Si and O element content values (atomic %) are obtained. The Si/O ratio for the organosilicon polymer is denoted by A, and the Si/O ratio for the silica fine particles is denoted by B. Measurement conditions are selected so that the value of A is significantly higher than the value of B. Specifically, measurements are carried out 10 times under the same conditions for the standard samples, and arithmetic mean values for A and B are obtained. Measurement conditions are selected so that obtained average values are such that $A/B>1.1$.

In cases where the Si/O ratio of protruded portions to be differentiated is further towards A than $[(A+B)/2]$, it is assessed that the protruded portions in question are the organosilicon polymer.

Tospearl 120A (produced by Momentive Performance Materials Inc.) is used as the standard sample of the organosilicon polymer, and HDK V15 (produced by Asahi Kasei Corporation) is used as the standard sample of the silica fine particles.

In addition, in cases where silicon is detected at locations other than protruded portions on the surface of the toner base particle, it can be assessed that silicon that is not corresponding to a protruded portion is detected. If silicon that is not corresponding to a protruded portion is detected, this shows that silicon is contained in the toner base particle. Furthermore, it can be confirmed that an intermediate layer is formed if a region in which silicon is detected is unevenly distributed towards the outer periphery of the toner base particle. In addition, the amount of intermediate layer formed can be confirmed by measuring the thickness of the region in which silicon is detected from the surface of the toner base particle. Furthermore, cross sectional TEM images can be used to confirm that a toner particle is one having a core-shell structure.

Method for Analyzing Intermediate Layer Component Contained in Organosilicon Polymer It can be confirmed that the organosilicon polymer that coats the toner base particle contains 3-methacryloxypropyltrimethoxysilane or 3-methacryloxypropyltriethoxysilane as a constituent monomer by subjecting toner particles to positive ion evaluation using time of flight secondary ion mass spectrometry (TOF-SIMS). Equipment used and measurement conditions are as follows.

Measurement apparatus: nanoTOF II (product name, produced by Ulvac-Phi)
Primary ion type: $Bi_3^{++}$
Accelerating voltage: 30 kV
Primary ion current: 0.05 pA
Repetition frequency: 8.2 kHz
Raster mode: Unbunch
Raster size: 50 μm×50 μm, 256×256 pixels
Measurement mode: Positive
Neutralizing electron gun: used
Measurement time: 600 seconds
Specimen preparation: fixing toner particle on indium sheet
Specimen pretreatment: none By imaging toner particles at m/z=247 and m/z=289 using Ulvac-Phi standard software (TOF-DR), it can be confirmed that the organosilicon polymer at the surface of the toner particle contains 3-methacryloxypropyltrimethoxysilane or 3-methacryloxypropyltriethoxysilane as a constituent monomer.

Method for Measuring Value of Ratio of Sc Relative to S (Sc/S)

The value of ratio of Sc relative to S (the coverage ratio of the surface of the toner particle by the organosilicon polymer) is calculated using a backscattered electron image of the surface of the toner particle.

A backscattered electron image of the surface of the toner particle is acquired using a scanning electron microscope (SEM).

The backscattered electron image obtained from the SEM is also known as a "compositional image", with atoms having lower atomic numbers being darker and atoms having higher atomic numbers being brighter.

Toner particles are generally resin particles containing mainly a composition comprising mainly carbon, such as resin components and a release agent. In cases where the organosilicon polymer is present at the surface of the toner particle, the organosilicon polymer is observed as a bright part and the toner particle surface is observed as a dark part in the backscattered electron image obtained from the SEM.

The SEM apparatus and observation conditions are as follows.

Apparatus used: ULTRA PLUS produced by Carl Zeiss Microscopy
Accelerating voltage: 1.0 kV
WD: 2.0 mm
Aperture Size: 30.0 μm
Detection signal: EsB (energy-selective backscattered electron)
EsB Grid: 800 V
Magnification ratio: 50,000 times
Contrast: 63.0±5.0% (reference value)
Brightness: 38.0±5.0% (reference value)
Resolution: 1024×768 pixels
Pretreatment: toner particles are sprayed onto a carbon tape (vapor deposition is not carried out).

Contrast and brightness are set as appropriate according to the status of the apparatus being used. In addition, the accelerating voltage and EsB Grid are set so as to acquire structural data at the uppermost surface of the toner particle, prevent charging up of undeposited specimen, and selectively detect backscattered electrons having high energy. The observed field of view is selected near an apex, where the curvature of the toner particle is at a minimum.

Method for Confirming that Bright Parts in Backscattered Electron Image Correspond to Organosilicon Polymer It is confirmed that bright parts in an observed backscattered electron image correspond to the organosilicon polymer by overlaying the backscattered electron image on an electron mapping image acquired using energy dispersive X-Ray analysis (EDS), which can be acquired using a scanning electron microscope (SEM).

The SEM/EDS apparatus and observation conditions are as follows.

Apparatus used (SEM): ULTRA PLUS produced by Carl Zeiss Microscopy
Apparatus used (EDS): NORAN System 7 produced by Thermo Fisher Scientific, Ultra
Dry EDS Detector
Accelerating voltage: 5.0 kV
WD: 7.0 mm
Aperture Size: 30.0 μm
Detection signal: SE2 (secondary electrons)
Magnification ratio: 50,000 times
Mode: Spectral Imaging
Pretreatment: Toner particles are sprayed onto a carbon tape and sputtered with platinum.

In this technique, the acquired silicon element mapping image is overlaid with the backscattered electron image, and it is confirmed that silicon atom parts in the mapping image match bright parts in the backscattered electron image. In this way, it is possible to confirm that the toner particle contains the organosilicon polymer at the surface of the toner base particle.

Moreover, the organosilicon polymer is differentiated from silica using the element content values of Si and O (atomic %).

The coverage ratio of the surface of the toner particle by the organosilicon polymer is calculated from the backscattered electron image of the uppermost surface of the toner particle, which is acquired using the techniques described above, using image editing software (ImageJ developed by Wayne Rashand). The procedure is described below.

First, an image is opened in ImageJ, and from "Type" in the "Image" menu, the backscattered electron image to be analyzed is converted to 8-bit. Next, using the "Straight Line" tool in the toolbar, the scale bar is selected in the observation conditions display area shown at the bottom of the backscattered electron image. In this state, when "Set Scale" is selected in the "Analyze" menu, a new window opens, and the straight line pixel distance selected in "Distance in Pixels" is inputted.

A scale bar value (for example, 100) is inputted in the "Known Distance" box in the aforementioned window, units for the scale bar (for example, nm) are inputted in the "Unit of Measurement" box, and scale settings are completed by clicking "OK".

Next, a median diameter of 2.0 pixels is set from "Filters" in the "Process" menu so as to reduce noise.

Next, "Threshold" is selected from "Adjust" in the "Image" menu. By checking "Dark background" and selecting "Auto", all pixels corresponding to the organosilicon polymer are selected, and a binarized image is acquired by clicking "Apply". By carrying out this procedure, pixels corresponding to regions where the toner base particle is exposed are shown as black and pixels corresponding to the organosilicon polymer are shown as white.

Next, the image center is estimated after excluding the observation conditions display area shown at the bottom of the backscattered electron image, and a region measuring 1.5 μm on each side is selected from the image center of the backscattered electron image using the "Rectangle Tool" in the toolbar.

"Set Measurements" is then selected in the "Analyze" menu, and "Area" is checked. "Analyze Particles" is selected in the "Analyze" menu, "Display Result" and "Summarize" are checked, and domain analysis is carried out by clicking "OK". The "% Area" shown here is the coverage ratio of the surface of the toner particle by the organosilicon polymer.

This procedure is carried out for 10 fields of view on a toner particle to be evaluated, and the arithmetic mean value is taken to be the ratio of Sc relative to S (Sc/S). Sc/S is a ratio where the total area of the surface of the toner particle is denoted by S ($\mu m^2$) and the area of those regions of the surface of the toner base particle coated with the organosilicon polymer at the surface of the toner particle is denoted by Sc.

Method for Measuring Degree of Reduction in Areal Ratio Using Carrier Shaking Method 2.0 g of toner particles are placed in a 50 mL cylindrical polyethylene bottle (internal diameter: mm), 50.0 g of a magnetic carrier (F813-300 produced by Powdertech; a gravity of 2.50 g/cm$^3$, a peak particle diameter of 44 μm, an average circularity of 0.85) is added, and the cylindrical polyethylene bottle is shaken back and forth for 10 hours at a rate of 150 strokes/min using a shaker (a YS-8D produced by Yayoi Co., Ltd.), which is a reciprocating shaker. Here, the stroke width is 80 mm and the shaking angle is 90°. Next, the carrier is removed using a magnet, and the obtained toner particles are measured using the Sc/S measurement method described above.

That is, when the toner particle before and after the test is measured in terms of the total area (S) of the surface of the toner particle and the area (Sc) of those regions of the surface of the toner base particle coated with the organosilicon polymer at the surface of the toner particle, the value of Sc/S of the toner particle before the test is defined as $R_0$ and the value of Sc/S of the toner particle after the test is defined as $R_1$, the value of $(R_0-R_1)/R_0$ is taken to be the degree of reduction in Sc/S following the test using the carrier shaking method. In cases where deformation/breakage of toner particles is observed in SEM observations of toner particles following the test, such cases are excluded from evaluations. Specifically, cases where cracking is seen in toner particles are excluded from evaluations.

Moreover, in cases where the magnetic carrier described above cannot be procured, similar measurements can be carried out by using a powder having a gravity of 2.40 g/cm$^3$ to 2.70 g/cm$^3$, a peak particle diameter of 30 μm to 50 μm, and an average circularity of 0.80 to 1.00.

Evaluation of Structure of Organosilicon Polymer

NMR is used to confirm that the organosilicon polymer has a structure represented by Formula (3). The organosilicon polymer is extracted in the following way.

1 g of toner is placed in a vial and dissolved and dispersed in 31 g of chloroform. A dispersed solution is prepared by dispersing for 30 minutes with an ultrasonic wave type homogenizer.

Ultrasonic wave treatment apparatus: VP-050 ultrasonic wave type homogenizer (available from Taitec Corporation)

Microchip: Step type microchip, tip diameter φ: 2 mm

Position of microchip tip: At the center of a glass vial, at a height of 5 mm from the bottom of the vial Ultrasonic wave conditions: intensity 30%, 30 minutes.

Here, the dispersion treatment is carried out while cooling the vial with ice water so that the temperature of the dispersed solution does not increase.

The dispersed solution is transferred to a (50 mL) swing rotor glass tube and subjected to centrifugal separation for 30 minutes at a rate of 58.33 s$^{-1}$ using a centrifugal separator (H-9R, available from Kokusan Co., Ltd.). Following the centrifugal separation, the organosilicon polymer in the glass tube undergoes layer separation. In cases where the organosilicon polymer and external additive components are both present, components separated into different layers are subjected to SEM-EDX observations, and a layer containing the organosilicon polymer is specified from the shell structure and the elemental composition of Si and O. This is extracted and dispersed again in 10 g of chloroform for washing, and the organosilicon polymer is separated using a centrifugal separator. After carrying out the washing procedure again, the extracted organosilicon polymer is vacuum dried (for 24 hours at 40° C.) so as to remove the chloroform and isolate the organosilicon polymer.

Using the thus isolated organosilicon polymer as a sample, structural evaluation is carried out by subjecting the organosilicon polymer to solid $^{29}$Si-NMR measurements.

In the solid $^{29}$Si-NMR measurements, peaks are detected in different shift regions according to the number of functional groups bonded to Si that constitutes the organosilicon polymer.

The number of functional groups in each peak is specified using standard samples. In addition, the abundance ratio of constituent compounds can be calculated from obtained peak areas. In cases where the organosilicon polymer has a T3 structure, a peak corresponding to this should be detected because the number of functional groups bonded to Si in a T3 structure is 1.

Examples of solid $^{29}$Si-NMR measurement conditions are as follows.

Apparatus: JNM-ECX500II produced by JEOL RESONANCE

Measurement temperature: room temperature

Measurement method: DDMAS method, $^{29}$Si, 45°

Specimen tube: zirconia 3.2 mmφ

Specimen: filled as powder in test tube

Specimen rotation speed: 10 kHz

Relaxation delay: 180 s

Number of accumulations: 2000

Standard substance for calibration: DSS (sodium 3-(trimethylsilyl)-1-propane sulfonate)

When measurements are carried out under the conditions described above, if a peak is present in the vicinity of, for example, −65 ppm, it can be assessed that the organosilicon polymer has a T3 structure, in which a substituent group is a methyl group.

In addition, R in Formula (3) above is identified using solid $^{13}C$-NMR.

Examples of solid $^{13}C$-NMR measurement conditions are as follows.

Apparatus: JNM-ECX500II produced by JEOL RESONANCE
Measurement temperature: room temperature
Pulse mode: CP/MAS
Measurement nucleus frequency: 123.25 MHz (13C)
Specimen tube: zirconia 3.2 mmφ
Specimen: filled as powder in test tube
Specimen rotation speed: 20 kHz
Standard substance: adamantane (external standard: 29.5 ppm)
Contact time: 2 ms
Delay time: 2 s
Number of accumulations: 1024

In this method, R in Formula (3) can be identified by the presence or absence of signals attributable to silicon atom-bonded methyl groups ($Si—CH_3$), ethyl groups ($Si—C_2H_5$), propyl groups ($Si—C_3H_7$), butyl groups ($Si—C_4H_9$), pentyl groups ($Si—C_5H_{11}$), hexyl groups ($Si—C_6H_{13}$) phenyl groups ($Si—C_6H_5$), and the like.

By carrying out solid $^{29}Si$-NMR and solid $^{13}C$-NMR measurements in the manner described above, it is possible to confirm the presence of a structure represented by Formula (3).

Identification of Monomer Units in Binder Resin

NMR is used to identify monomer units contained in the binder resin. In addition, the same method is used for confirming that the binder resin contains a vinyl resin and that the vinyl resin contains a monomer unit represented by (1).

Chloroform-soluble matter in the toner particle is used as a specimen. Specifically, a specimen is prepared so that the concentration of toner particles in chloroform is 0.1 mass %, and this solution is filtered using a 0.45 μm PTFE filter and then subjected to measurements as a specimen. Vinyl resin components are isolated using gradient polymer LC. Isolation conditions are shown below.

Apparatus: ULTIMATE 3000 (produced by Thermo Fisher Scientific)
Mobile phase: A: chloroform (HPLC), B: acetonitrile (HPLC)
Gradient: 2 min (A/B=0/100)→25 min (A/B=100/0)
(Moreover, the gradient of the change in mobile phase was linear.)
Flow rate: 1.0 mL/min
Injected amount: 0.1 mass %×20 μL
Column: Tosoh TSKgel ODS (4.6 mmφ×150 mm×5 μm)
Column temperature: 40° C.
Detector: Corona charged particle detector (Corona-CAD) (produced by Thermo Fisher Scientific)

Isolation is carried out for a period of time corresponding to the vinyl resin (10 to 13 minutes). In the isolation, required amounts of chloroform/acetonitrile solutions are taken, concentrated and dried, and a vinyl resin sample is then obtained. Using this sample, molecular structure measurements are carried out using nuclear magnetic resonance (NMR).

1 mL of deuterated chloroform is added to 20 mg of the vinyl resin sample, and a $^1H$-NMR spectrum of the obtained specimen is measured. Structures of monomer units can be determined from the obtained NMR spectrum. For example, in the case of a styrene-acrylic copolymer, structural analysis can be carried out on the basis of a peak in the vicinity of 6.5 ppm, which is attributable to a styrene monomer unit, and a peak attributable to an acrylic monomer unit in the vicinity of 3.5 to 4.0 ppm.

The following apparatus and measurement conditions can be used for the nuclear magnetic resonance (NMR).

NMR apparatus: RESONANCE ECX500 produced by JEOL Ltd.
Measurement frequency: 500 MHz
Observation nuclei: protons
Measurement mode: single pulse
Pulse conditions: 5.0 s
Frequency range: 10,500 Hz
Number of accumulations: 64
Measurement temperature: 20° C.

Method for Obtaining Toner Particle by Removing External Additives from Toner

In cases where measurements are carried out on the surface of a toner having an external additive deposited on the surface thereof and cases where a toner particle is to be measured, measurements are carried out using the methods described above after obtaining a toner particle by removing external additives using the following procedure.

A 61.5% aqueous sucrose solution is prepared by adding 160 g of sucrose (available from Kishida Chemical Co., Ltd.) to 100 mL of ion exchanged water and dissolving the sucrose while immersing in hot water. A dispersed solution is prepared by placing 31.0 g of the concentrated sucrose solution and 6 g of Contaminon N (product name) (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) in a centrifugal separation tube. 1.0 g of toner is added to this dispersed solution and lumps of the toner are broken into smaller pieces using a spatula or the like.

The centrifugal separation tube is shaken for 20 minutes at a rate of 300 spm (strokes per min) using a shaker. Following the shaking, the solution is transferred to a (50 mL) swing rotor glass tube and subjected to separation for 30 minutes at a speed of 3500 rpm using a centrifugal separator.

It is confirmed by visual inspection that toner particles are sufficiently separated from the aqueous solution and external additives settle at the bottom of the glass tube, and toner particles separated into the uppermost layer are collected using a spatula or the like. The collected toner particles are filtered using a vacuum filtration device and then dried for 1 hour or longer using a dryer. Toner particles are obtained by crushing the dried product with a spatula.

EXAMPLES

The present disclosure will now be explained in further detail by means of production examples and working examples, but these examples in no way limit the present disclosure. Moreover, in the working examples and comparative examples, “parts” and “%” are all on a mass basis unless explicitly stated otherwise.

Production Example of Toner 1

Synthesis of Polyester Resin 1

Polyester resin 1 was synthesized using the following procedure.

The materials listed below were placed in an autoclave equipped with a depressurization device, a water separation device, a nitrogen gas inlet device, a temperature measurement device and a stirrer, and a reaction was carried out for 5 hours at 200° C. at normal pressure in a nitrogen atmosphere.

| | |
|---|---|
| Adduct of 2.0 moles of propylene oxide to bisphenol A: | 77.4 parts |
| Terephthalic acid: | 15.8 parts |
| Isophthalic acid: | 15.8 parts |
| Tetrabutoxy titanate: | 0.2 parts |

The materials listed below were then added, and a reaction was carried out for 3 hours at 220° C.

| | |
|---|---|
| Trimellitic acid: | 0.1 parts |
| Tetrabutoxy titanate: | 0.3 parts |

A reaction was carried out for a further 2 hours at a reduced pressure of 10 to 20 mmHg. Polyester resin 1 was obtained by dissolving the obtained polyester resin in chloroform, adding this chloroform solution of the polyester resin dropwise to ethanol, reprecipitating and filtering. The weight average molecular weight Mw of the obtained polyester resin 1 was 10,200.

Synthesis of Polyester Resin 2

Polyester resin 2 was obtained in the same way as in the synthesis of polyester resin 1, except that the added quantity of trimellitic acid was changed to 1.0 parts. The weight average molecular weight Mw of the obtained polyester resin 2 was 19,500.

Synthesis of Silicon-Containing Polyester Resin

A silicon-containing polyester resin was synthesized using the following procedure.

A silicon-containing polyester resin was synthesized in the manner described below by amidation of a carboxyl group in the polyester resin 2 and an amino group in the aminosilane.

100.0 parts of the polyester resin 2 was dissolved in 400.0 parts of N,N-dimethylacetamide, and the materials listed below were added thereto and stirred for 5 hours at normal temperature. Following completion of the reaction, the N,N-dimethylacetamide solution of this polyester resin was added dropwise to methanol, reprecipitated and filtered to obtain a silicon-containing polyester resin.

| | |
|---|---|
| Silane compound: 3-aminopropyltrimethoxysilane: | 1.2 parts |
| Condensing agent: DMT-MM (4-(4,4-dimethoxy-1,3,5-triazin-2-yl)-4-methylmorpholinium chloride): | 2.4 parts |

The obtained silicon-containing polyester resin had a silicon concentration of 0.20 wt % and a weight average molecular weight Mw of 19,700. Moreover, the silicon concentration was quantified by means of X-Ray fluorescence analysis using a calibration curve produced from standard specimens.

Process for Preparing Organosilicon Compound Aqueous Solution 1

60.0 parts of ion exchanged water, which had been adjusted to a pH of 4.0 using hydrochloric acid, and 40.0 parts of methyltrimethoxysilane as a compound of an organosilicon compound aqueous solution were mixed in a reaction vessel equipped with a stirring device, and then stirred until a uniform phase was formed, thereby obtaining organosilicon compound aqueous solution 1, in which an alkoxysilane was hydrolyzed.

Process for Preparing Organosilicon Compound Aqueous Solutions 2 to 7

Organosilicon compound aqueous solutions 2 to 7 were obtained in the same way as in the process for preparing organosilicon compound aqueous solution 1, except that methyltrimethoxysilane was replaced by materials shown in Tables 1-1, 1-2 and 1-3 or Tables 1-4, 1-5 and 1-6.

Production of Aqueous Medium 1

390.0 parts of ion exchanged water and 14.0 parts of sodium phosphate (dodecahydrate) (produced by Rasa Industries, Ltd.) were placed in a reaction vessel, and the reaction vessel was maintained at a temperature of 65° C. for 1.0 hours while purging with nitrogen.

Next, while stirring the aqueous solution inside the reaction vessel at 12,000 rpm using a T.K. Homomixer (produced by Tokushu Kika Kogyo Co., Ltd.), an aqueous calcium chloride solution, which was obtained by dissolving 9.2 parts of calcium chloride (dihydrate) in 10.0 parts of ion exchanged water, was introduced all at once, thereby preparing an aqueous medium containing a dispersion stabilizer.

Aqueous medium 1 was then obtained by introducing 10% hydrochloric acid into the aqueous medium so as to adjust the pH to 6.0.

Production of Polymerizable Monomer Composition 1

| | |
|---|---|
| Styrene: | 60.0 parts |
| Coloring agent (C.I. Pigment Blue 15:3): | 6.5 parts |

A dispersed solution 1 in which the colorant was dispersed was prepared by introducing the materials listed above into an attritor (produced by Nippon Coke and Engineering Co., Ltd.) and then dispersing for 5.0 hours at 220 rpm using zirconia particles having diameters of 1.7 mm.

The materials listed below were then added to dispersed solution 1.

| | |
|---|---|
| Styrene: | 16.0 parts |
| Butyl acrylate: | 18.0 parts |
| Long chain acrylate (lauryl acrylate): | 9.0 parts |
| Polyester resin 1: | 4.0 parts |
| Divinylbenzene: | 0.1 parts |
| Hydrocarbon wax (melting point: 79° C.): | 5.0 parts |
| Ester wax (ethylene glycol distearate): | 15.0 parts |

These were held at a temperature of 65° C. and homogeneously dissolved and dispersed at 500 rpm using a T.K. Homomixer, thereby preparing polymerizable monomer composition 1.

Granulation Step

While maintaining the temperature of aqueous medium 1 at 70° C. and maintaining the rotation speed of a high speed stirrer (a T.K. Homomixer produced by Tokushu Kika Kogyo Co., Ltd.) at 12,000 rpm, polymerizable monomer composition 1 was introduced into aqueous medium 1, and 9.0 parts of t-butyl peroxypivalate was added as a polymerization initiator. Granulation was carried out for 10 minutes while maintaining the rotation speed of the high speed stirrer at 12,000 rpm.

Polymerization Step

The high speed stirrer was replaced by a stirring machine having a propeller type stirring blade, polymerization was carried out for 5.0 hours while stirring at 150 rpm and maintaining a temperature of 70° C., the temperature was increased to 85° C., and a polymerization reaction was carried out by heating for 2.0 hours, thereby obtaining toner base particle-dispersed solution 1.

0.20 parts of 3-methacryloxypropyltrimethoxysilane was then added as an intermediate layer component and stirred for 5 minutes at 150 rpm, and a 1 mol/L aqueous solution of sodium hydroxide was then added to adjust the pH to 9.0. Residual monomer was then removed by increasing the temperature to 98° C. and heating for 3.0 hours, and a treatment temperature of 60° C. was maintained for 1.0 hours while continuing to stir at 150 rpm.

Next, ion exchanged water and hydrochloric acid were added so that the toner base particle-dispersed solution had a toner base particle concentration of 20.0% and a first preset pH of 5.0. 18.3 parts of organosilicon compound aqueous solution 1 was then added over a period of 1 minute to 500 parts of toner base particle-dispersed solution 1. 0.02 parts of 3-methacryloxypropyltrimethoxysilane was then added as an additional component to the organosilicon compound. After maintaining the first preset pH for a period of 30 minutes and a temperature of 60° C., the pH of the slurry was adjusted to a second preset pH of 9.0 using an aqueous solution of sodium hydroxide. Next, the second preset pH was maintained for a period of 300 minutes and the temperature was maintained at 60° C., thereby forming an organosilicon polymer at the surface of the toner base particle and obtaining a toner particle slurry.

Washing/Drying Step

Following completion of the polymerization step, the toner particle slurry was cooled, hydrochloric acid was added to the toner particle slurry to adjust the pH to 1.5, and the slurry was stirred for 1 hour and then subjected to solid-liquid separation by means of filtration to obtain a toner cake. This toner cake was washed with ion exchanged water, filtered, dried and classified to obtain toner 1. Physical properties of the obtained toner are shown in Table 2. The organosilicon polymer contained in the toner particle contained in toner 1 had a T3 structure.

Production of Toners 2 to 11 and Comparative Toners 1 to 7

Toners 2 to 11 and comparative toners 1 to 7 were obtained in the same way as in the production of toner 1, except that the formulation used in the production of the polymerizable monomer composition, the intermediate layer component and the number of parts thereof in the polymerization step, the number of the organosilicon compound aqueous solution and the type of compound therein, components added to the organosilicon compound and conditions used in the polymerization step were changed in the manner shown in Tables 1-1, 1-2 and 1-3 or Tables 1-4, 1-5 and 1-6. Moreover, a silicon-containing polyester resin, 1,6-hexane diol diacrylate and organosilicon compounds to be introduced into the dispersed solution, which were not used in the production of toner 1, were added when other materials such as styrene were added to dispersed solution 1. Physical properties of the obtained toners are shown in Table 2. Organosilicon polymers contained in toner particles contained in toners 2 to 11 and comparative toners 1 to 7 had a T3 structure.

Evaluation 1: Evaluation of Rubbing Fixability

A modified LBP712Ci (produced by Canon Inc.) was used as an image forming apparatus. The processing speed of this apparatus was modified to 250 mm/sec. In addition, essential adjustments were carried out so that image formation was possible under these conditions. In addition, toners were removed from the black and cyan cartridges and replaced with 50 g each of a toner to be evaluated. The toner laid-on level was 1.0 $mg/cm^2$. Images were outputted after altering fixing unit settings so that the temperature of the fixing unit was 10° C. lower than the temperature before modifications were carried out.

Rubbing fixability was evaluated using the following procedure. First, the halftone image density was adjusted on A4 size Canon Oce Red Label paper (basis weight 80 $g/m^2$) so that the image density was from 0.75 to 0.80, as measured by a Macbeth reflectance densitometer (produced by Macbeth Corp.), and images were then outputted. Next, a fixed image was rubbed 10 times with a lens-cleaning paper while applying a load of 5.4 kPa (55 $g/cm^2$), and rubbing fixability was evaluated on the basis of the degree of decrease in fixed image density after the rubbing. A lower decrease in image density indicates a toner having superior rubbing fixability. Evaluations were carried out in accordance with the assessment criteria shown below. An evaluation of C or better was assessed as being good. The evaluation results are shown in Table 3.

A: Less than 4%
B: Not less than 4% but less than 8%
C: Not less than 8% but less than 12%
D: Not less than 12% but less than 16%
E: not less than 16%

Evaluation 2: Evaluation of Mottle

The apparatus used in Evaluation 1 was used as an image forming apparatus, and halftone images were used as evaluation images. A4 size Canon Oce Red Label paper (basis weight 80 $g/m^2$) was used as a recording material. In addition, fixing unit settings were altered so that the temperature of the fixing unit was 10° C. lower than the temperature before modifications were carried out. By using Oce Red Label paper, which has a relatively high surface roughness, image density non-uniformity (mottle) of halftone images can be evaluated harshly. In addition, by increasing the temperature of the fixing unit by 10° C., melting and spreading is enhanced at protruding portions of the paper, meaning that image density non-uniformity of halftone images tends to occur, which leads to harsher evaluations.

For solid images, intermediate tone (halftone) images are outputted when the toner laid-on level is 1.0 $mg/cm^2$, and image density non-uniformity of obtained images was evaluated according to the criteria shown below and mottle was evaluated. An evaluation of C or better was assessed as being good. The evaluation results are shown in Table 3.

A: Image density non-uniformity was not noticeable at all
B: Slight image density non-uniformity could be seen if the image was observed closely
C: Some image density non-uniformity, but not particularly noticeable D: Image density non-uniformity was noticeable in some places E: Image density non-uniformity was noticeable throughout Evaluation 3: Evaluation of Charge Rising Performance The following evaluation was carried out in a high temperature high humidity environment (a temperature of 30° C. and a relative humidity of 80%).

Two specimens were prepared by placing 19.0 g of a magnetic carrier (F813-300 produced by Powdertech) and 1.0 g of a toner to be evaluated in a 50 mL plastic bottle having a lid.

Two-component developers were prepared by shaking a bottle for 2 minutes or 10 minutes at a speed of 4 reciprocations per second using a shaker (a YS-LD produced by Yayoi Co., Ltd.).

0.200 g of a two-component developer to be measured in terms of triboelectric charge quantity was placed in a metal measurement container 2 having a 500 mesh (opening size 25 μm) screen 3 at the bottom, as shown in the FIGURE, and a metal lid 4 was placed on the container. At this point, the mass of the overall measurement container 2 was measured and recorded as W1 (g).

Next, suction is carried out from a suction port 7 in a suction device 1 (at least that part of the suction device 1 that is in contact with the measurement container 2 is an insulator), and an air quantity control valve 6 is adjusted so that the pressure on a vacuum gauge 5 is 50 mmAq. In this state, toner was removed by suction for 1 minute.

At this point, the voltage of a potentiometer 9 is denoted by V (Volts). Here, 8 is a capacitor which has a capacity of C (μF). Following the suction, the mass of the overall measurement container was measured and recorded as W2 (g). The triboelectric charge quantity (mC/kg) of this toner is calculated using the formula below.

$$\text{Triboelectric charge quantity } Q(\text{mC/kg})=(C\times V)/(W1-W2)$$

These toner triboelectric charge quantity measurements were carried out on the two-component developer that had been shaken for 2 minutes by the shaker and the two-component developer that had been shaken for 10 minutes by the shaker. Next, the value of "triboelectric charge quantity toner shaken for 2 minutes"/"triboelectric charge quantity toner shaken for 10 minutes"×100 was calculated, and the result was taken to be the charge rising performance, which was evaluated using the criteria shown below. The evaluation results are shown in Table 3.

A: Charge rising performance of at least 90%

B: Charge rising performance of at least 80% but less than 90%

C: Charge rising performance of at least 70% but less than 80%

D: Charge rising performance of at least 60% but less than 70%

E: Charge rising performance of less than 60%

Evaluation 4: Evaluation of Ejected Paper Sticking

Using the same image forming apparatus as that used in Evaluation 1, 200 whole-page solid images were continuously outputted on both sides of paper sheets in a normal temperature normal humidity environment (a temperature of 23° C. and a relative humidity of 60%). Here, XEROX 4200 paper (produced by XEROX, 75 g/$m^2$) was used as an evaluation paper. A paper bundle discharged from a paper discharge unit was allowed to stand for at least 30 minutes in a stacked state and cooled to room temperature. Next, individual sheets were separated, and image sticking was evaluated on the basis of the number of blank dots in the solid image (also referred to as defects hereinafter). In cases where image sticking hardly occurs, the number of blank dots in a solid image is lower. However, in cases where image sticking is significant, paper sheets where solid images are adjacent tend to stick to each other. As a result, if a paper bundle is torn off, blank dots occur in solid images and the number of blank dots in solid images increases. This was carried out for the 200 sheets of paper printed on both sides, the number of defects on the sheets of paper was measured, and the average number of defects per sheet of paper was calculated. An evaluation of C or better was assessed as being good. The evaluation results are shown in Table 3.

A: No defects

B: Slight defects could be seen if a magnifying glass was used, but these could not be seen by eye C: Defects able to be seen by eye could be seen on the paper, but the average number of such defects was not more than 3

D: Defects able to be seen by eye could be seen on the paper, but the average number of such defects was from 4 to 10

E: The number of defects able to be seen by eye was at least 11

TABLE 1-1

| | Toner 1 | Toner 2 | Toner 3 |
|---|---|---|---|
| Production of polymerizable monomer composition | | | |
| Number of parts of styrene | 16.0 Parts | 12.0 Parts | 10.0 Parts |
| Number of parts of butyl acrylate | 18.0 Parts | 22.0 Parts | 24.0 Parts |
| Type of long chain acrylate | Lauryl acrylate | Tricosyl acrylate | Undecyl acrylate |
| Number of parts of long chain acrylate | 9.0 Parts | 8.0 Parts | 9.0 Parts |
| Number of parts of polyester resin 1 | 4.0 Parts | 4.0 Parts | 4.0 Parts |
| Number of parts of silicon-containing polyester resin | Not used | Not used | Not used |
| Number of parts of divinylbenzene | 0.1 Parts | 0.1 Parts | 0.1 Parts |
| Number of parts of 1,6-hexane diol diacrylate | Not used | Not used | Not used |
| Number of parts of hydrocarbon wax | 5.0 Parts | Not used | 5.0 Parts |
| Type of ester wax | Ethylene glycol distearate | Ethylene glycol distearate | Ethylene glycol distearate |
| Number of parts of ester wax | 15.0 Parts | 15.0 Parts | 15.0 Parts |
| Type of organosilicon compound for introduction into dispersed solution | Not used | Not used | Not used |
| Number of parts of organosilicon | | | |

TABLE 1-1-continued

| | Toner 1 | Toner 2 | Toner 3 |
|---|---|---|---|
| compound for introduction into dispersed solution | | | |
| Polymerization step | | | |
| Intermediate layer component | 3-methacryloxypropyl-trimethoxysilane | 3-methacryloxypropyl-trimethoxysilane | 3-methacryloxypropyl-triethoxysilane |
| Number of parts of intermediate layer component | 0.20 Parts | 0.31 Parts | 0.23 Parts |
| No. of organosilicon compound aqueous solution | 1 | 2 | 3 |
| Type of compound in organosilicon compound aqueous solution | Methyltrimethoxy-silane | Phenyltrimethoxy-silane | n-propyltrimethoxy-silane |
| Component added to organosilicon compound | 3-methacryloxypropyl-trimethoxysilane | None | 3-methacryloxypropyl-triethoxysilane |
| Treatment temperature | 60° C. | 60° C. | 55° C. |
| First preset pH | pH 5.0 | pH 11.5 | pH 9.0 |
| Length of introduction time of organosilicon compound aqueous solution | 1 Minutes | 1 Minutes | 120 Minutes |
| Number of parts of organosilicon compound aqueous solution | 18.3 Parts | 9.5 Parts | 27.1 Parts |
| Number of parts of component added to organosilicon compound | 0.02 Parts | — | 0.03 Parts |
| Holding time of first preset pH | 30 Minutes | 300 Minutes | 300 Minutes |
| Second preset pH | pH 9.0 | Not set | Not set |
| Holding time of second preset pH | 300 Minutes | | |

TABLE 1-2

| | Toner 4 | Toner 5 | Toner 6 |
|---|---|---|---|
| Production of polymerizable monomer composition | | | |
| Number of parts of styrene | 16.0 Parts | 16.0 Parts | 10.0 Parts |
| Number of parts of butyl acrylate | 18.0 Parts | 18.0 Parts | 30.0 Parts |
| Type of long chain acrylate | Stearyl acrylate | Behenyl acrylate | Not used |
| Number of parts of long chain acrylate | 9.0 Parts | 10.0 Parts | |
| Number of parts of polyester resin 1 | 4.0 Parts | 4.0 Parts | 4.0 Parts |
| Number of parts of silicon-containing polyester resin | Not used | Not used | Not used |
| Number of parts of divinylbenzene | 0.1 Parts | 0.1 Parts | 0.1 Parts |
| Number of parts of 1,6-hexane diol diacrylate | Not used | Not used | Not used |
| Number of parts of hydrocarbon wax | Not used | 5.0 Parts | Not used |
| Type of ester wax | Ethylene glycol distearate | Ethylene glycol distearate | Ethylene glycol distearate |
| Number of parts of ester wax | 15.0 Parts | 20.0 Parts | 12.0 Parts |
| Type of organosilicon compound for introduction into dispersed solution | Not used | Not used | Not used |
| Number of parts of organosilicon compound for introduction into dispersed solution | | | |
| Polymerization step | | | |
| Intermediate layer component | 3-methacryloxypropyl-trimethoxysilane | 3-methacryloxypropyl-dimethoxymethylsilane | 3-methacryloxypropyl-trimethoxysilane |
| Number of parts of intermediate layer component | 0.19 Parts | 0.18 Parts | 0.21 Parts |
| No. of organosilicon compound aqueous solution | 4 | 1 | 1 |
| Type of compound in organosilicon compound aqueous solution | Hexyltrimethoxysilane | Methyltrimethoxysilane | Methyltrimethoxysilane |
| Component added to organosilicon compound | None | None | 3-methacryloxypropyl-trimethoxysilane |
| Treatment temperature | 55° C. | 50° C. | 55° C. |
| First preset pH | pH 5.5 | pH 7.0 | pH 9.0 |
| Length of introduction time of organosilicon compound aqueous solution | 1 Minutes | 1 Minutes | 120 Minutes |
| Number of parts of organosilicon compound aqueous solution | 26.5 Parts | 5.0 Parts | 21.0 Parts |
| Number of parts of component added to organosilicon compound | — | — | 0.02 Parts |

TABLE 1-2-continued

| | Toner 4 | Toner 5 | Toner 6 |
|---|---|---|---|
| Holding time of first preset pH | 60 Minutes | 60 Minutes | 300 Minutes |
| Second preset pH | pH 9.5 | pH 10.0 | Not set |
| Holding time of second preset pH | 240 Minutes | 120 Minutes | |

TABLE 1-3

| | Toner 7 | Toner 8 | Toner 9 |
|---|---|---|---|
| Production of polymerizable monomer composition | | | |
| Number of parts of styrene | 18.0 Parts | 15.0 Parts | 15.0 Parts |
| Number of parts of butyl acrylate | 22.0 Parts | 25.0 Parts | 25.0 Parts |
| Type of long chain acrylate | Not used | Not used | Not used |
| Number of parts of long chain acrylate | | | |
| Number of parts of polyester resin 1 | 4.0 Parts | 4.0 Parts | 4.0 Parts |
| Number of parts of silicon-containing polyester resin | Not used | Not used | Not used |
| Number of parts of divinylbenzene | 0.1 Parts | 0.1 Parts | 0.1 Parts |
| Number of parts of 1,6-hexane diol diacrylate | Not used | Not used | Not used |
| Number of parts of hydrocarbon wax | 5.0 Parts | 5.0 Parts | 5.0 Parts |
| Type of ester wax | Ethylene glycol distearate | Ethylene glycol distearate | Ethylene glycol distearate |
| Number of parts of ester wax | 10.0 Parts | 12.0 Parts | 15.0 Parts |
| Type of organosilicon compound for introduction into dispersed solution | Not used | Not used | Not used |
| Number of parts of organosilicon compound for introduction into dispersed solution | | | |
| Polymerization step | | | |
| Intermediate layer component | 3-methacryloxypropyl-trimethoxysilane | 3-methacryloxypropyl-dimethoxymethylsilane | 3-methacryloxypropyl-trimethoxysilane |
| Number of parts of intermediate layer component | 0.24 Parts | 0.26 Parts | 0.30 Parts |
| No. of organosilicon compound aqueous solution | 1 | 1 | 5 |
| Type of compound in organosilicon compound aqueous solution | Methyltrimethoxysilane | Methyltrimethoxysilane | Octyltriethoxysilane |
| Component added to organosilicon compound | 3-methacryloxypropyl-trimethoxysilane | None | 3-methacryfoxypropyl-trimethoxysilane |
| Treatment temperature | 60° C. | 60° C. | 60° C. |
| First preset pH | pH 11.5 | pH 11.5 | pH 11.5 |
| Length of introduction time of organosilicon compound aqueous solution | 1 Minutes | 1 Minutes | 1 Minutes |
| Number of parts of organosilicon compound aqueous solution | 8.5 Parts | 10.0 Parts | 23.3 Parts |
| Number of parts of component added to organosilicon compound | 0.01 Parts | | 0.03 Parts |
| Holding time of first preset pH | 300 Minutes | 300 Minutes | 300 Minutes |
| Second preset pH | Not set | Not set | Not set |
| Holding time of second preset pH | | | |

TABLE 1-4

| | Toner 10 | Toner 11 | Comparative toner 1 |
|---|---|---|---|
| Production of polymerizable monomer composition | | | |
| Number of parts of styrene | 22.0 Parts | 8.0 Parts | 10.0 Parts |
| Number of parts of butyl acrylate | 18.0 Parts | 32.0 Parts | 30.0 Parts |
| Type of long chain acrylate | Not used | Not used | Not used |
| Number of parts of long chain acrylate | | | |
| Number of parts of polyester resin 1 | 4.0 Parts | 4.0 Parts | 4.0 Parts |
| Number of parts of silicon-containing polyester resin | Not used | Not used | Not used |
| Number of parts of divinylbenzene | Not used | 0.1 Parts | 0.1 Parts |

TABLE 1-4-continued

| | Toner 10 | Toner 11 | Comparative toner 1 |
|---|---|---|---|
| Number of parts of 1,6-hexane diol diacrylate | 1.0 Parts | Not used | Not used |
| Number of parts of hydrocarbon wax | 5.0 Parts | 7.0 Parts | Not used |
| Type of ester wax | Not used | Ethylene glycol distearate | Behenyl behenate |
| Number of parts of ester wax | | 30.0 Parts | 10.0 Parts |
| Type of organosilicon compound for introduction into dispersed solution | Not used | Not used | Vinyltriethoxysilane |
| Number of parts of organosilicon compound for introduction into dispersed solution | | | 15.0 Parts |
| Polymerization step | | | |
| Intermediate layer component | 3-methacryloxypropyl-trimethoxysilane | 3-methacryloxypropyl-dimethoxymethylsilane | Not used |
| Number of parts of intermediate layer component | 0.33 Parts | 0.03 Parts | |
| No. of organosilicon compound aqueous solution | 6 | 7 | Not used |
| Type of compound in organosilicon compound aqueous solution | Decyltrimethoxysilane | Vinyltriethoxysilane | |
| Component added to organosilicon compound | None | None | None |
| Treatment temperature | 60° C. | 55° C. | 90° C. |
| First preset pH | pH 11.5 | pH 5.5 | pH 8.0 |
| Length of introduction time of organosilicon compound aqueous solution | 1 Minutes | 1 Minutes | — |
| Number of parts of organosilicon compound aqueous solution | 13.5 Parts | 19.0 Parts | — |
| Number of parts of component added to organosilicon compound | — | — | — |
| Holding time of first preset pH | 300 Minutes | 60 Minutes | 450 Minutes |
| Second preset pH | Not set | pH 9.5 | Not set |
| Holding time of second preset pH | | 240 Minutes | |

TABLE 1-5

| | Comparative toner 2 | Comparative toner 3 | Comparative toner 4 |
|---|---|---|---|
| Production of polymerizable monomer composition | | | |
| Number of parts of styrene | 10.0 Parts | 20.0 Parts | 14.0 Parts |
| Number of parts of butyl acrylate | 30.0 Parts | 20.0 Parts | 26.0 Parts |
| Type of long chain acrylate | Not used | Not used | Not used |
| Number of parts of long chain acrylate | | | |
| Number of parts of polyester resin 1 | 4.0 Parts | 5.0 Parts | Not used |
| Number of parts of silicon-containing polyester resin | Not used | 3.0 Parts | 6.0 Parts |
| Number of parts of divinylbenzene | 0.1 Parts | 0.2 Parts | 0.2 Parts |
| Number of parts of 1,6-hexane diol diacrylate | Not used | Not used | Not used |
| Number of parts of hydrocarbon wax | Not used | 7.0 Parts | 10.0 Parts |
| Type of ester wax | Behenyl behenate | Not used | Behenyl behenate |
| Number of parts of ester wax | 10.0 Parts | | 10.0 Parts |
| Type of organosilicon compound for introduction into dispersed solution | 3-methacryloxypropyl-trimethoxysilane | Not used | Not used |
| Number of parts of organosilicon compound for introduction into dispersed solution | 15.0 Parts | | |
| Polymerization step | | | |
| Intermediate layer component | Not used | Not used | Not used |
| Number of parts of intermediate layer component | | | |
| No. of organosilicon compound aqueous solution | Not used | 1 | 1 |
| Type of compound in organosilicon compound aqueous solution | | Methyltrimethoxysilane | Methyltrimethoxysilane |
| Component added to organosilicon compound | None | None | None |
| Treatment temperature | 90° C. | 50° C. | 60° C. |

TABLE 1-5-continued

| | Comparative toner 2 | Comparative toner 3 | Comparative toner 4 |
|---|---|---|---|
| First preset pH | pH 8.0 | pH 7.0 | pH 11.5 |
| Length of introduction time of organosilicon compound aqueous solution | — | 1 Minutes | 1 Minutes |
| Number of parts of organosilicon compound aqueous solution | — | 5.0 Parts | 10.4 Parts |
| Number of parts of component added to organosilicon compound | — | — | — |
| Holding time of first preset pH | 450 Minutes | 60 Minutes | 300 Minutes |
| Second preset pH | Not set | pH 9.5 | Not set |
| Holding time of second preset pH | | 120 Minutes | |

TABLE 1-6

| | Comparative toner 5 | Comparative toner 6 | Comparative toner 7 |
|---|---|---|---|
| Production of polymerizable monomer composition | | | |
| Number of parts of styrene | 15.0 Parts | 14.0 Parts | 12.0 Parts |
| Number of parts of butyl acrylate | 25.0 Parts | 26.0 Parts | 22.0 Parts |
| Type of long chain acrylate | Not used | Not used | Tricosyl acrylate |
| Number of parts of long chain acrylate | | | 8.0 Parts |
| Number of parts of polyester resin 1 | 5.0 Parts | 6.0 Parts | 4.0 Parts |
| Number of parts of silicon-containing polyester resin | Not used | Not used | Not used |
| Number of parts of divinylbenzene | Not used | 0.2 Parts | 0.1 Parts |
| Number of parts of 1,6-hexane diol diacrylate | 0.5 Parts | Not used | Not used |
| Number of parts of hydrocarbon wax | 5.0 Parts | 10.0 Parts | Not used |
| Type of ester wax | Ethylene glycol distearate | Not used | Ethylene glycol distearate |
| Number of parts of ester wax | 15.0 Parts | | 15.0 Parts |
| Type of organosilicon compound for introduction into dispersed solution | Not used | Not used | Not used |
| Number of parts of organosilicon compound for introduction into dispersed solution | | | |
| Polymerization step | | | |
| Intermediate layer component | Not used | Not used | 3-methacryloxypropyl-dimethoxymethylsilane |
| Number of parts of intermediate layer component | | | 0.31 Parts |
| No. of organosilicon compound aqueous solution | 1 | 1 | 2 |
| Type of compound in organosilicon compound aqueous solution | Methyltrimethoxysilane | Methyltrimethoxysilane | Phenyltrimethoxysilane |
| Component added to organosilicon compound | None | None | None |
| Treatment temperature | 55° C. | 60° C. | 60° C. |
| First preset pH | pH 9.0 | pH 5.0 | pH 11.5 |
| Length of introduction time of organosilicon compound aqueous solution | 120 Minutes | 1 Minutes | 1 Minutes |
| Number of parts of organosilicon compound aqueous solution | 29.6 Parts | 24.7 Parts | 8.0 Parts |
| Number of parts of component added to organosilicon compound | — | — | — |
| Holding time of first preset pH | 300 Minutes | 30 Minutes | 300 Minutes |
| Second preset pH | Not set | pH 9.0 | Not set |
| Holding time of second preset pH | | 300 Minutes | |

TABLE 2

| | $R_0$ | $(R_0-R_1)/R_0$ | Storage elastic modulus (Pa) of disc-like specimen at 100° C. | G'base(100) (Pa) | Thickness of intermediate layer | m/z = 247 detected in TOF-SIMS (Y/N) | m/z = 289 detected in TOF-SIMS (Y/N) |
|---|---|---|---|---|---|---|---|
| Toner 1 | 0.60 | 0.05 | 42000 | 11000 | Thickness 25 nm | Y | N |
| Toner 2 | 0.30 | 0.19 | 8100 | 4300 | Thickness 39 nm | N | N |
| Toner 3 | 0.70 | 0.03 | 44200 | 2200 | Thickness 25 nm | N | Y |
| Toner 4 | 0.55 | 0.06 | 37000 | 12000 | Thickness 24 nm | N | N |
| Toner 5 | 0.50 | 0.08 | 28500 | 9500 | Thickness 22 nm | N | N |
| Toner 6 | 0.65 | 0.04 | 49500 | 11500 | Thickness 26 nm | Y | N |
| Toner 7 | 0.35 | 0.16 | 28700 | 19200 | Thickness 30 nm | Y | N |
| Toner 8 | 0.40 | 0.11 | 31000 | 16000 | Thickness 35 nm | N | N |
| Toner 9 | 0.45 | 0.08 | 35100 | 15100 | Thickness 38 nm | Y | N |
| Toner 10 | 0.30 | 0.18 | 26500 | 21500 | Thickness 42 nm | N | N |
| Toner 11 | 0.55 | 0.20 | 23800 | 1800 | Thickness 4 nm | N | N |
| Comparative toner 1 | 0.92 | 0.09 | 61000 | 12000 | Not detected (*1) | N | N |
| Comparative toner 2 | 0.88 | 0.05 | 63400 | 12400 | Not detected (*1) | N | N |
| Comparative toner 3 | 0.52 | 0.22 | 34700 | 18700 | Thickness 4 nm (*2) | N | N |
| Comparative toner 4 | 0.41 | 0.31 | 23900 | 14900 | Thickness 8 nm (*2) | N | N |
| Comparative toner 5 | 0.69 | 0.26 | 27800 | 13600 | Not detected | N | N |
| Comparative toner 6 | 0.62 | 0.33 | 28100 | 16100 | Not detected | N | N |
| Comparative toner 7 | 0.28 | 0.19 | 7900 | 4300 | Thickness 38 nm | N | N |

In the table, *1 indicates that silicon corresponding to the intermediate layer was not detected in cross sectional observations of a toner particle by TEM-EDX, but silicon corresponding to protruded parts at the surface of the toner base particle was detected.

In addition, (*2), which relates to the thickness of the intermediate layer in comparative toners 3 and 4, is the thickness corresponding to the silicon-containing polyester resin, not the intermediate layer.

TABLE 3

| | Rubbing fixability | (Degree of decrease in image density) | Mottle | Charge rising performance | (Numerical value) | Discharged paper adhesion | Number of visible defects |
|---|---|---|---|---|---|---|---|
| Toner 1 | A | 3.1% | A | A | 95% | A | 0 |
| Toner 2 | A | 1.2% | C | A | 91% | B | 0 |
| Toner 3 | A | 3.8% | A | A | 93% | A | 0 |
| Toner 4 | A | 2.9% | B | A | 92% | A | 0 |
| Toner 5 | A | 2.5% | B | A | 92% | A | 0 |
| Toner 6 | A | 3.7% | A | A | 95% | B | 0 |
| Toner 7 | A | 3.4% | B | A | 93% | C | 3 |
| Toner 8 | A | 3.1% | C | A | 91% | C | 2 |
| Toner 9 | A | 3.2% | A | B | 84% | B | 0 |
| Toner 10 | B | 4.2% | C | B | 81% | C | 3 |
| Toner 11 | A | 2.6% | C | C | 78% | B | 0 |
| Comparative toner 1 | D | 14.2% | A | E | 56% | C | 1 |
| Comparative toner 2 | D | 13.6% | A | E | 59% | C | 2 |
| Comparative toner 3 | B | 2.7% | D | D | 63% | C | 3 |
| Comparative toner 4 | A | 2.8% | E | D | 62% | D | 5 |
| Comparative toner 5 | B | 4.3% | D | D | 67% | C | 3 |
| Comparative toner 6 | B | 4.1% | E | D | 65% | C | 3 |
| Comparative toner 7 | A | 0.9% | D | B | 88% | C | 2 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113834, filed Jul. 15, 2022 and Japanese Patent Application No. 2023-102647, filed Jun. 22, 2023 which are hereby incorporated by reference herein in their entirety.

What is claimed is:

1. A toner, comprising:

a toner particle comprising a toner base particle and an organosilicon polymer at a surface of the toner base particle;

the toner base particle comprising a binder resin and having protruded portions constituted from the organosilicon polymer present at the surface of the toner base particle, wherein a storage elastic modulus at 100° C. of a disc-like specimen obtained by compression molding the toner into a disc-like shape is 8000 to 50,000 Pa, and $R_0$ is 0.30 to 0.70 and $(R_0-R_1)/R_0$ is 0.20 or less when after a container with the toner particle and a magnetic carrier is reciprocatingly shaken for 10 hours at a stroke rate of 150/min, a stroke width of 80 mm and a shaking angle of 90°, the toner particle is measured in terms of a total area S of a surface of the toner particle and an area Sc of those regions of the surface of the toner base particle coated with the organosilicon polymer at the surface of the toner particle before and after shaking, and $R_0$ is a value of Sc/S for the toner particle before shaking and $R_1$ is a value of Sc/S for the toner particle after shaking.

2. The toner according to claim 1, wherein the toner particle has a core-shell structure comprising a core particle with a shell formed on a surface of the core particle, the core particle comprises the binder resin, and the shell comprises the organosilicon polymer.

3. The toner according to claim 1, wherein the binder resin comprises a vinyl resin having a monomer unit represented by Formula (1):

(1)

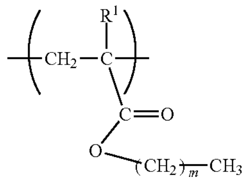

where $R^1$ denotes a hydrogen atom or a methyl group, and m denotes an integer of 10 to 22.

4. The toner according to claim 1, wherein G'base (100) is 2000 to 20,000 Pa when G'base (100) is a storage elastic modulus at 100° C. of a disc-like specimen obtained by compression molding an obtained toner base particle into a disc-like shape after subjecting the toner particle to processes of treatments (i) to (iii) below in this order (i) dispersing toner particle in an aqueous solution of sodium hydroxide having a pH of 13.5 to obtain an aqueous dispersion, (ii) heating the aqueous dispersion to 55° C. and stirring for 3 hours at 150 rpm using a magnetic stirrer, and (iii) subjecting the heated and stirred aqueous dispersion of treatment (ii) to vacuum filtration, washed 5 times with reverse osmosis water, and then vacuum drying for 24 hours at 40° C.

5. The toner according to claim 1, wherein the organosilicon polymer has a T3 structure represented by $R—SiO_{3/2}$ when R denotes an alkyl group having 1 to 6 carbon atoms or a phenyl group.

6. The toner according to claim 1, wherein the toner particle comprises an intermediate layer at the surface of the toner base particle, and silicon corresponding to the intermediate layer is detected at the surface of the toner base particle in an observation of a cross section of the toner using TEM-EDX.

7. The toner according to claim 6, wherein a thickness of the intermediate layer is 3 to 46 nm.

8. The toner according to claim 6, wherein a peak is detected at m/z=247 or m/z=289 in TOF-SIMS positive measurements of the surface of the toner particle.

9. The toner according to claim 6, wherein the binder resin and intermediate layer both comprise a structure represented by Formula (4)

(4)

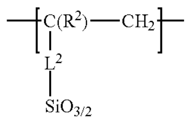

when $L^2$ denotes $—COO(CH_2)_n—$, n denotes an integer of 1 to 10, a carbonyl group in $L^2$ bonds to a carbon atom having $R^2$ in the main chain, and $R^2$ denotes a hydrogen atom or a methyl group.

* * * * *